US011839914B1

(12) United States Patent
Schmuland et al.

(10) Patent No.: US 11,839,914 B1
(45) Date of Patent: Dec. 12, 2023

(54) PROCESS MONITORING AND FEEDBACK FOR METAL ADDITIVE MANUFACTURING USING POWDER-BED FUSION

(71) Applicant: Freeform Future Corp., El Segundo, CA (US)

(72) Inventors: Derek Schmuland, El Segundo, CA (US); Thomas J Ronacher, Los Angeles, CA (US); Erik Palitsch, Manhattan Beach, CA (US)

(73) Assignee: Freeform Future Corp., Hawthorne, CA (US)

( * ) Notice: Subject to any disclaimer, the term of this patent is extended or adjusted under 35 U.S.C. 154(b) by 405 days.

(21) Appl. No.: 16/773,876

(22) Filed: Jan. 27, 2020

Related U.S. Application Data

(60) Provisional application No. 62/943,473, filed on Dec. 4, 2019, provisional application No. 62/799,709, filed on Jan. 31, 2019.

(51) Int. Cl.
*B33Y 50/02* (2015.01)
*B22F 10/10* (2021.01)
*G06F 17/14* (2006.01)
*B33Y 30/00* (2015.01)
*B33Y 10/00* (2015.01)

(52) U.S. Cl.
CPC ............... *B22F 10/10* (2021.01); *B33Y 10/00* (2014.12); *B33Y 30/00* (2014.12); *B33Y 50/02* (2014.12); *G06F 17/142* (2013.01)

(58) Field of Classification Search
CPC .......... B22F 10/00; B22F 10/10; B33Y 10/00; B33Y 30/00; B33Y 50/02; G06F 17/142
See application file for complete search history.

(56) References Cited

U.S. PATENT DOCUMENTS

| 4,660,981 | A | 4/1987 | Stridsberg |
| 5,063,280 | A | 11/1991 | Inagawa et al. |
| 5,358,673 | A | 10/1994 | Heller et al. |
| 6,483,071 | B1 | 11/2002 | Hunter et al. |
| 9,314,972 | B2 | 4/2016 | Green |
| 10,272,525 | B1 | 4/2019 | Buller et al. |
| 10,994,337 | B2 * | 5/2021 | Khairallah ............ B22F 10/368 |
| 2015/0352668 | A1 | 12/2015 | Scott et al. |
| 2016/0107233 | A1 | 4/2016 | Kobayashi et al. |
| 2016/0193790 | A1 * | 7/2016 | Shuck ...................... B22F 5/009 700/119 |

(Continued)

FOREIGN PATENT DOCUMENTS

WO WO-2018136622 A1 * 7/2018 ............. A61B 18/22

OTHER PUBLICATIONS

A. Chalabyan, "How 3-D printing will transform the metals industry," McKinsey & Company, Aug. 2017.

(Continued)

*Primary Examiner* — Jigneshkumar C Patel
(74) *Attorney, Agent, or Firm* — Huse IP Law; Charles C. Huse

(57) ABSTRACT

A method of metal additive manufacturing includes generating a plurality of laser beams and directing the plurality of laser beams to selected portions of a surface of a powder bed of powdered metal. The method also includes monitoring the powder bed while performing the generating and directing, and adjusting at least one of the generating or directing based on the monitoring.

14 Claims, 17 Drawing Sheets

(56) References Cited

U.S. PATENT DOCUMENTS

| | | |
|---|---|---|
| 2016/0199911 A1 | 7/2016 | Dave et al. |
| 2017/0144253 A1 | 5/2017 | Martinsen et al. |
| 2017/0173737 A1 | 6/2017 | Gray |
| 2017/0182562 A1* | 6/2017 | Das ................... B23P 6/007 |
| 2017/0239719 A1 | 8/2017 | Buller et al. |
| 2017/0304944 A1 | 10/2017 | Symeonidis et al. |
| 2017/0341183 A1 | 11/2017 | Buller et al. |
| 2018/0080103 A1* | 3/2018 | Plotkowski ............ C22F 1/04 |
| 2018/0126670 A1* | 5/2018 | DehghanNiri ....... B29C 64/386 |
| 2018/0143147 A1 | 5/2018 | Milner et al. |
| 2018/0180803 A1* | 6/2018 | Victor .............. B23K 26/032 |
| 2018/0185959 A1 | 7/2018 | Mathews, Jr. et al. |
| 2018/0193955 A1 | 7/2018 | Karp et al. |
| 2018/0290239 A1 | 10/2018 | Gonzalez et al. |
| 2018/0326656 A1 | 11/2018 | Herzog et al. |
| 2018/0345413 A1 | 12/2018 | Wuest et al. |
| 2019/0009358 A1* | 1/2019 | Vorontsov ............. H01S 3/067 |
| 2019/0101833 A1 | 4/2019 | Shih |
| 2019/0299286 A1 | 10/2019 | Feldmann et al. |
| 2020/0147867 A1 | 5/2020 | Gold |
| 2020/0316863 A1 | 10/2020 | Vaes et al. |

OTHER PUBLICATIONS

A. Laskin et al., "Optics to Control Thermal Effects in Selective Laser Melting," SPIE LASE, Feb. 26, 2018.

A. Okunkova et al., "Experimental approbation of selective laser melting of powders by the use of non-Gaussian bower density distributions," Physics Procedia 56, 2014, pp. 48-57.

A. Varotsis, "Introduction to Binder Jetting 3D printing," 3D Hubs (saved 4 times between Dec. 12, 2018 and Jan. 31, 2020 by the Internet Archive).

A. Varotsis, "Introduction to metal 3D printing," 3D Hubs (saved 2 times between Jun. 18, 2019 and Jan. 31, 2020 by the Internet Archive).

A.S. Metel et al., "Power Density Distribution for Laser Additive Manufacturing (SLM): Potential, Fundamentals and Advanced Applications," Technologies, Dec. 30, 2018.

A.V. Gusarov et al., "On productivity of laser additive manufacturing," Journal of Materials Processing Tech. 261, May 31, 2018, pp. 213-232.

B. Victor et al., "Laser landscape," Shop Floor Lasers, Mar./Apr. 2018, pp. 11-17.

C.L.A. Leung et al., "In situ X-ray imaging of defect and molten pool dynamics in laser additive manufacturing," Nature Communications 9:1355, 2018.

D. Conover, "Metal Additive Manufacturing: A simulation provider's perspective," Metal Additive Manufacturing vol. 4 No. 3, Autumn/Fall 2018, pp. 175-180.

D. Kupper et al., "Get Ready for Industrialized Additive Manufacturing," Boston Consulting Group, Apr. 5, 2017.

D. Sher, "Discovering the Four-Laser SLM 500 HL 3D Printer with SLM Solutions' Director of Engineering," 3DPrint.com, Mar. 2, 2016.

D.S. Thomas et al., "Costs and Cost Effectiveness of Additive Manufacturing," National Institute of Standards and Technology Special Publication 1176, Dec. 2014.

Frost & Sullivan's Global 360 Research Team, "Global Additive Manufacturing Market, Forecast to 2025," Frost & Sullivan, MB74-10, May 2016.

I.A. Okaro, "Automatic Fault Detection for Selective Laser Melting using Semi-Supervised Machine Learning," Additive Manufacturing vol. 27, May 2019, pp. 42-53.

J.O. Milewski, "Additive Manufacturing of Metals," Springer Series in Materials Science, 2017, pp. 85-90, 114-115, 131-147, 223-227.

L. STRAMA, "Protecting Additive Manufacturing Workflow with Blockchain Technology," CEOWorld Magazine, Nov. 8, 2018.

M. Kanskar et al., "Laser Diodes: The power of brilliance—the past and future of high-power semiconductor lasers," Laser Focus World, Jan. 18, 2018.

M. Munsch et al., "Binder Jetting and FDM: A comparison with Laser Powder Bed Fusion and Metal Injection Moulding," Metal Additive Manufacturing vol. 4 No. 3, Autumn/Fall 2018, pp. 159-167.

M. Saunders, "How process parameters drive successful metal AM part production," Metal Additive Manufacturing vol. 4 No. 2, 2018, pp. 127-135.

O. Diegel et al., "Additive Manufacturing: Myths, misconceptions and untruths," Metal Additive Manufacturing vol. 4 No. 3, Autumn/Fall 2018, pp. 169-173.

P. Hooper, "Melt pool temperature and cooling rates in laser powder bed fusion," Additive Manufacturing 22, 2018, pp. 548-559.

Renishaw, "RenAM 500Q multi-laser AM system data sheet," Feb. 2018.

S. Khairallah et al., "Laser powder-bed fusion additive manufacturing: Effects of main physical processes on dynamical melt flow and pore formation from mesoscopic powder simulation," ResearchGate, Dec. 2015.

S. Ly et al., "Metal vapor micro-jet controls material redistribution in laser powder bed fusion additive manufacturing," Nature Scientific Reports 7:4085, Jun. 22, 2017.

T.M. Wischeropp et al., "Simulation of the effect of different laser beam intensity profiles on heat distribution in selective laser melting," Lasers in Manufacturing Conference 2015.

V. Gunenthiram et al., "Analysis of laser-melt pool-powder bed interaction during the selective laser melting of a stainless steel," Journal of Laser Applications 29(2), May 2017.

W. Zhang et al., "Machine Learning Enabled Powder Spreading Process Map for Metal Additive Manufacturing (AM)," Solid Freeform Fabrication 2017, pp. 1235-1249.

W.J. Sames et al., "The Metallurgy and Processing Science of Metal Additive Manufacturing," International Materials Review, Mar. 7, 2016, pp. 315-360.

* cited by examiner

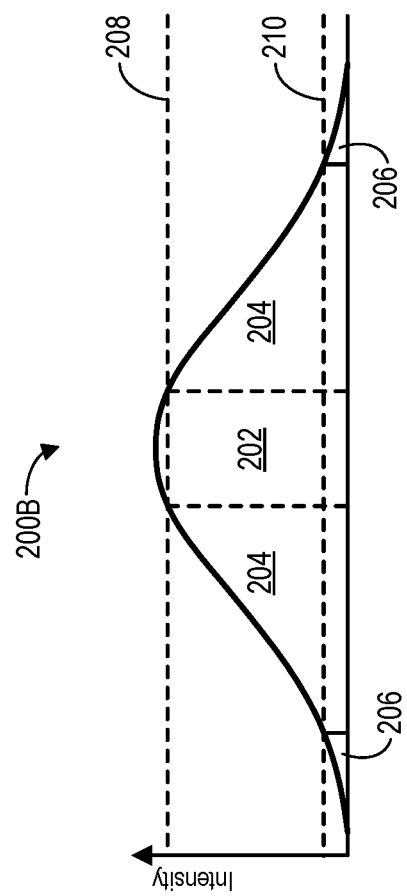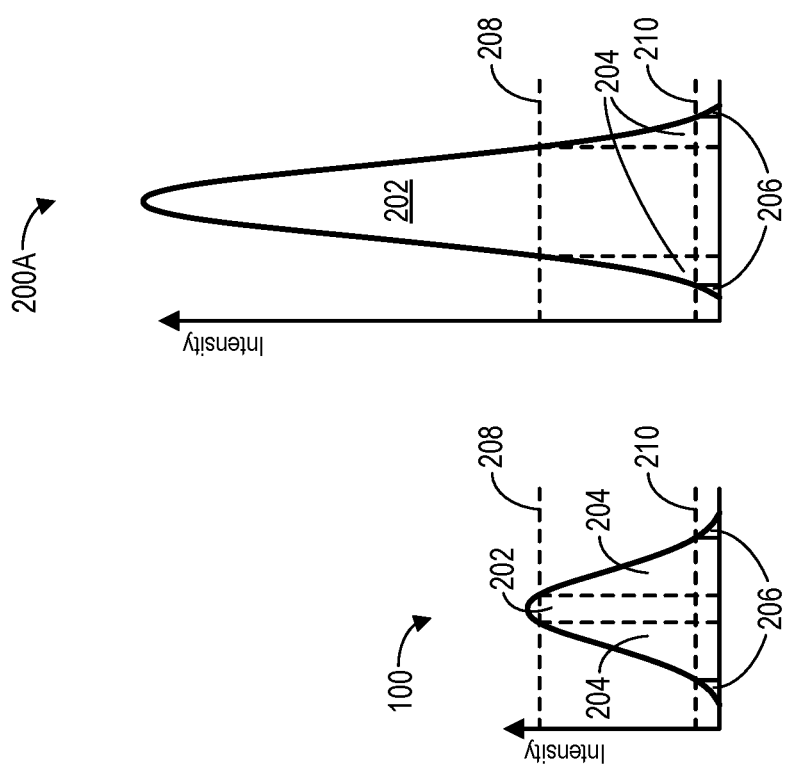

PROCESS MONITORING AND FEEDBACK FOR METAL ADDITIVE MANUFACTURING USING POWDER-BED FUSION

RELATED APPLICATIONS

This application claims priority to U.S. Provisional Patent Applications No. 62/799,709, filed Jan. 31, 2019, and 62/943,473, filed Dec. 4, 2019, both of which are hereby incorporated by reference in their entirety.

TECHNICAL FIELD

This disclosure relates to metal additive manufacturing (i.e., 3D printing of metals), and more specifically to metal additive manufacturing using laser-based powder-bed fusion, which is also referred to as laser powder-bed fusion or selective laser melting.

BACKGROUND

Metal additive manufacturing offers multiple benefits over traditional metal manufacturing techniques. For example, previously impossible geometries can be printed, separate components can be consolidated into a single part, and the weight of metal parts can be reduced (e.g., by printing a metal mesh). Part-specific tooling can be avoided, as can stockpiling of spare parts. Scrap can be reduced, as can raw-material lead times. Different parts may be produced on demand from a single 3D metal printer (i.e., a single 3D printer for printing metal).

Despite these benefits, however, metal additive manufacturing currently amounts to a tiny fraction—well under one percent—of the total metal manufacturing market. Metal additive manufacturing processes often are not robust, stable, and repeatable, resulting in trial-and-error manufacturing and low-quality products, when compared to the material properties of machined-from-billet or forged parts. Also, throughput of 3D metal printers can be low.

SUMMARY

Accordingly, there is a need for improved methods and systems of selective laser melting for powder-bed fusion.

In some embodiments, a method of metal additive manufacturing includes generating a plurality of laser beams and directing the plurality of laser beams to selected portions of a surface of a powder bed of powdered metal. The method also includes monitoring the powder bed while performing the generating and directing, and adjusting at least one of the generating or directing based on the monitoring.

In some embodiments, a metal additive manufacturing system includes a 3D metal printer comprising a plurality of lasers and a powder bed for powdered metal and further includes one or more processors and memory storing instructions that, when executed by the one or more processors, cause the 3D metal printer to perform this method. In some embodiments, a non-transitory computer-readable storage medium stores one or more programs for execution by one or more processors of a metal additive manufacturing system that further comprises a plurality of lasers and a powder bed for powdered metal. The one or more programs include instructions for performing this method.

BRIEF DESCRIPTION OF THE DRAWINGS

For a better understanding of the various described implementations, reference should be made to the Detailed Description below, in conjunction with the following drawings.

FIGS. 1 and 2A-2B are hypothetical examples of cross-sectional intensity profiles of respective Gaussian laser beams used for powder-bed fusion.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Of the different available types of metal additive manufacturing, such as binder jetting, direct-energy deposition, and powder-bed fusion, only powder-bed fusion is both scalable and capable of producing high-quality, high-precision parts. Powder-bed fusion involves selectively melting powdered metal using a heat source such as a laser or electron beam. Selective laser melting for powder-bed fusion is capable of producing superior material properties compared to other metal additive manufacturing technologies.

Selective laser melting for powder-bed fusion still faces significant challenges, however. For example, to increase build speed and thus throughput, laser power may be increased. But high-power laser beams waste beam energy by vaporizing powdered metal instead of melting it and by ejecting high-velocity metal spatter from the powder bed that damages optical components. Furthermore, the failure of high-power laser beams to melt powdered metal evenly causes part defects. High-power laser beams can be defocused to mitigate these problems, but defocusing reduces manufacturing precision and can result in part defects. High-power laser systems have a host of other problems, such as thermal lensing, thermal-management challenges, laser-induced damage to optical components, and high expense, complexity, and size.

Figure 6:
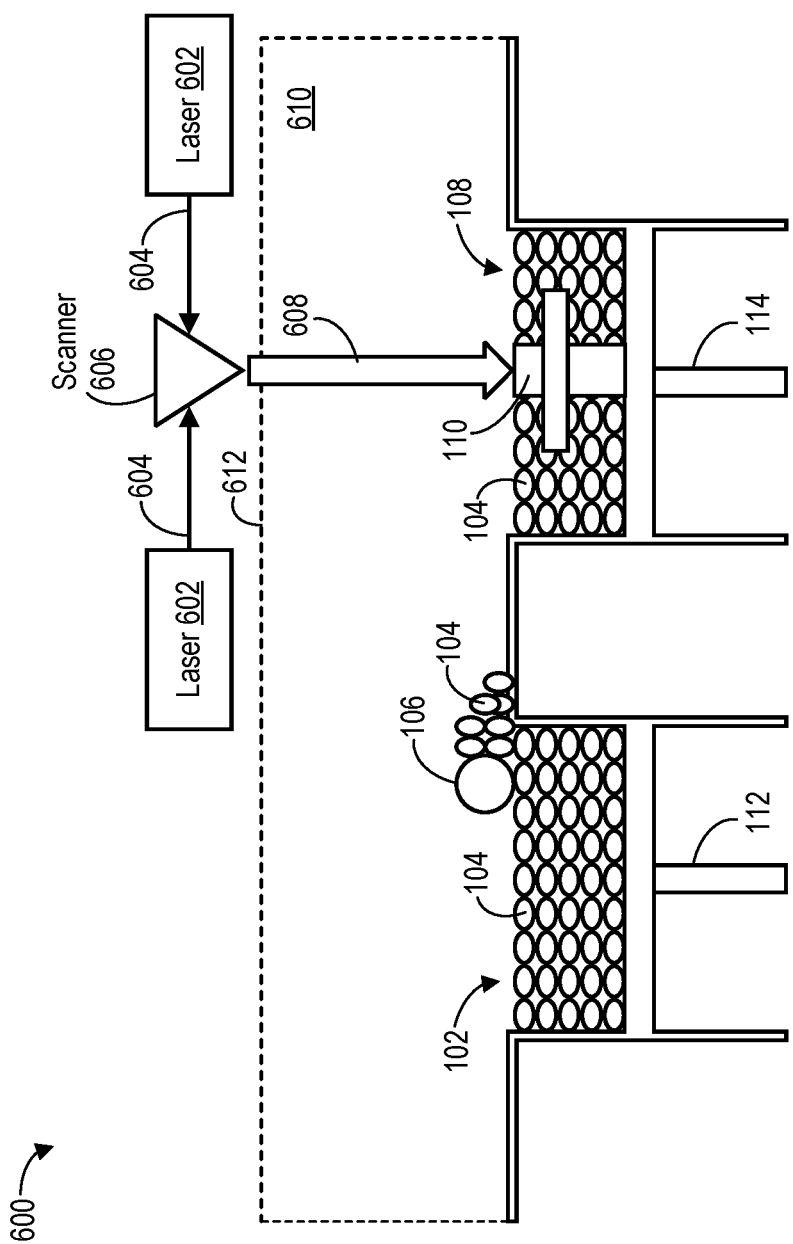
FIG. 6 is a schematic illustration of a 3D metal printer with a plurality of lasers and a scanner in accordance with some embodiments.

FIGS. 1 and 2A-2B are examples of cross-sectional intensity profiles of respective laser beams 100, 200A, and 200B that are usable in laser powder-bed fusion. In some examples, the profiles may be substantially Gaussian. The laser beam 100 (FIG. 1) is a low power (e.g., approximately 100-400 W) laser beam, but a center portion 202 of the laser beam 100 has an intensity that is above a first threshold 208 and is thus high enough to cause ejection of metal splatter from the powder bed 108 (FIG. 6). Portions 204 of the laser beam 100 surrounding the center portion 202 have a lower intensity than the center portion 202. The intensity of the portions 204 is sufficient to melt powdered metal 104 (FIG. 6) and thus to create a melt pool because it is above a second threshold 210, but does not cause significant metal-splatter ejection because it is below the first threshold 208. The intensity of tail portions 206 of the laser beam 100 is below the second threshold 210 and thus too low to melt the powdered metal 104.

Figure 3B:
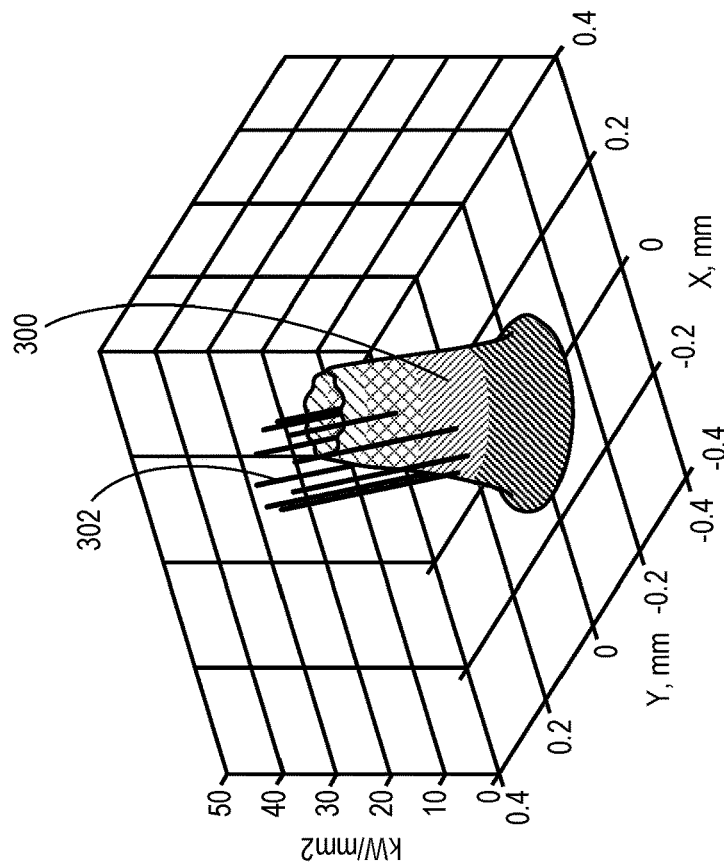
FIGS. 3B and 3C show three-dimensional perspective views of simulated clusters of laser beams used for powder-bed fusion in accordance with some embodiments.
Figure 3A:
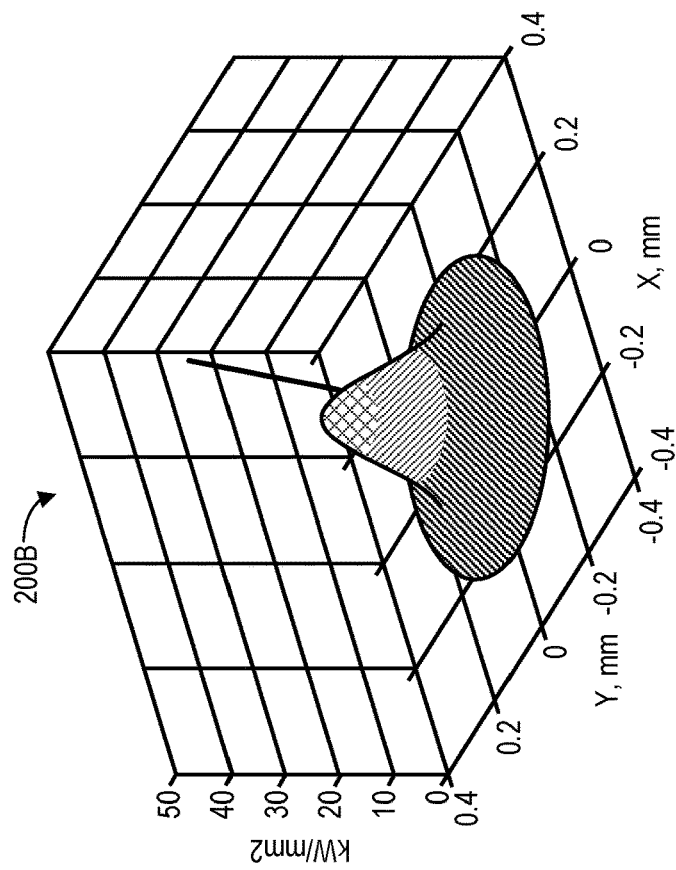
FIG. 3A shows a three-dimensional perspective view of a simulated example of the laser beam of FIG. 2B.

As previously discussed, it may be desirable to increase the intensity of the laser beam 100 to increase build speed and thus throughput. FIG. 2A shows a high-power (e.g., approximately 1 kW) laser beam 200A with the same width (e.g., 100 um), and thus spot size, as the low-power laser beam 100. The region 202, in which the intensity is above the first threshold 208, makes up a much greater portion of the laser beam 200A than of the laser beam 100. The portion of the intensity above the first threshold 208 is too high to contribute to melting metal and instead contributes to metal-splatter ejection. The laser beam 200A thus causes significantly more metal-splatter ejection than the laser beam 100. This ejection may damage the 3D metal printer (e.g., the optics) and may cause keyholing along with other defects in the metal structure being fabricated. To mitigate these problems, the laser beam 200A may be defocused, resulting in a defocused laser beam 200B (FIG. 2B). The laser beam 200B is still high power (e.g., 1 kW), but has a lower maximum intensity and a much higher width (e.g., 400 um) than the laser beam 200A. Use of the defocused laser beam 200B for powder-bed fusion significantly reduces the precision of the fabrication process, however. FIG. 3A shows a three-dimensional perspective view of a simulated example of the defocused laser beam 200B. The angle of propagation of the laser beam 200B with respect to the powder-bed surface (i.e., the x-y plane) is shown by a straight line in FIG. 3A.

Instead of using a single high-power defocused laser beam 200B, a plurality of laser beams may be clustered through a beamforming process, with the cluster being directed to selected portions of the surface of the powder bed 108. FIG. 3B shows a three-dimensional perspective view of a simulated, prophetic cluster 300 of laser beams 302, which form an approximate 3D-doughnut intensity profile in accordance with some embodiments. (Each laser beam 302 is represented in FIG. 3B by a straight line showing its angle of propagation with respect to the powder-bed surface, but actually has a substantially Gaussian intensity profile in accordance with some embodiments.) The laser beams 302 that compose the cluster 300 are nearly collinear (as indicated by the corresponding straight lines in FIG. 3B being nearly parallel), but may converge slightly as they approach the powder-bed surface. (Each individual laser beam 302 may be collimated, then expanded and focused, before being clustered into the cluster 300.) The laser beams 302 of the cluster 300 may be steered together, collectively, for example as described below with respect to FIGS. 6-9. Each of the laser beams 302 has a lower power than the laser beam 200B.

Figure 3C:
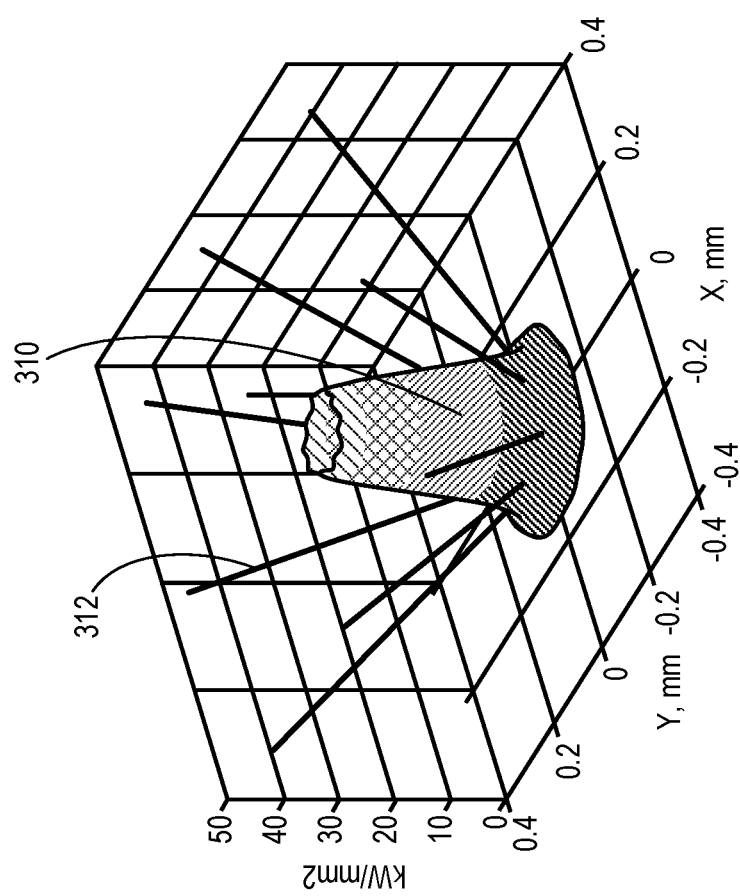

FIG. 3C shows a three-dimensional perspective view of another simulated, prophetic cluster 310 of laser beams 312 in accordance with some embodiments. The laser beams 312 that compose the cluster 310 are not nearly collinear, but instead come together from different directions (as indicated by the corresponding straight lines in FIG. 3C). (In some examples, one or more (e.g., each) of the individual laser beams 312 may be collimated, then expanded and focused, before being clustered into the cluster 310.) In some examples, one or more (e.g., each) of the laser beams 312 may be steered independently, for example as described below with respect to FIGS. 10-12. In some of the examples, some or all of the laser beams 312 may have a lower power than the laser beam 200B.

In the examples of FIGS. 3B and 3C, the clusters 300 and 310 each include nine laser beams 302 or 312, each of which is a 110 W beam, in order to result in equivalent total power as the laser beam 200B. In general, however, the number and power of the laser beams in a cluster may vary. For example, it is possible to eliminate the cosine-projection effect that results from the incidence angle of the cluster of lasers not being orthogonal to the powder bed surface by changing the position of the beams within the cluster and changing the power of some of the beams. The intensity and thermal profiles of a cluster may be customized by independently controlling the component laser beams 302 (FIG. 3B) or 312 (FIG. 3C), as may the shape that a cluster forms on the powder-bed surface. This independent control may include adjusting a respective laser beam, for example by changing (increasing or decreasing) the temporal-dependent delivered power of the laser beam. One or more laser beams may be added to or removed from a cluster. In the example of FIG. 3C, the shape (and corresponding intensity and thermal profiles) of a cluster may be changed by independently steering one or more respective laser beams to change the location of the one or more respective laser beams within the cluster. In some embodiments, the power of individual laser beams in a cluster may be 500 W or less, or 300 W or less (e.g., 100-300 W or 200-300 W), or 200 W or less (e.g., 100-200 W), or 100 W or less. In general, a cluster includes two or more laser beams that at least partially overlap each other in a region of the powder bed surface. For example, a cluster includes two or more laser beams (e.g., 2-5 laser beams), five or more laser beams (e.g., 5-10 laser beams), 10 or more laser beams (e.g., 10-20 laser beams), or 20 or more laser beams (e.g., more than 20 laser beams) that at least partially overlap. The unified intensity profile of the clustered superposition of the laser beams (i.e., of the cluster) may, in some examples, allow for more precise control of the shape, size, depth, and dynamics of the melt pool, and/or the efficiency of melting (per unit mass required energy required for melting).

Figure 4:
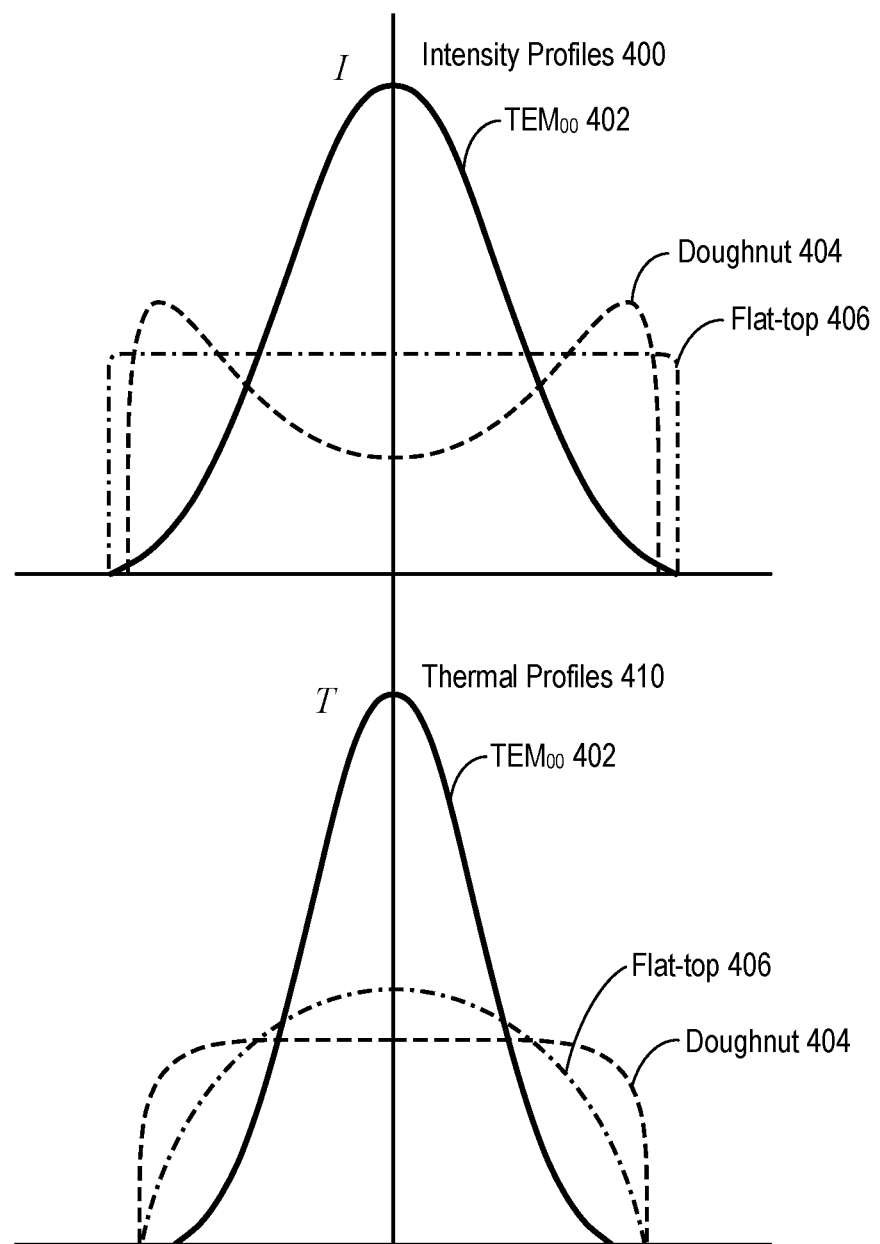
FIG. 4 shows simulated, prophetic cross-sectional intensity profiles and resulting thermal profiles for a single-track linear toolpath for doughnut-shaped and flat-top-shaped laser-beam clusters as compared to a single high-power Gaussian-shaped laser beam.

FIG. 4 shows simulated, prophetic cross-sectional intensity profiles 400 and thermal profiles 410 for a doughnut-shaped laser-beam cluster 404 and flat-top-shaped laser-beam cluster 406 as compared to a single high-power Gaussian-shaped (e.g., $TEM_{00}$) laser beam 402. The terms "doughnut-shaped" and "flat-top-shaped" refer to the shapes of respective cross-sectional intensity profiles 400. The Gaussian-shaped laser beam 402 has a Gaussian-shaped thermal profile with strong temperature variation across the width of the laser beam. The flat-top-shaped laser-beam cluster 406 has a curved, semicircular thermal profile 410 that is more uniform than the thermal profile 410 for the Gaussian-shaped laser beam 402, but still varies significantly across the width of the beam. The doughnut-shaped laser-beam cluster 404 has a substantially more uniform thermal profile 404 across the width of the beam than the flat-top-shaped laser-beam cluster 406, such that the temperature of the resulting melt pool is substantially even across the melt pool. This even temperature results in melt pools with weaker thermal gradients, which promote a more stable, higher quality powder-bed fusion process with less defects. Accordingly, a laser-beam cluster with a doughnut-shaped cross-sectional intensity profile may be used in a powder-bed fusion process in accordance with some embodiments.

Figure 5:
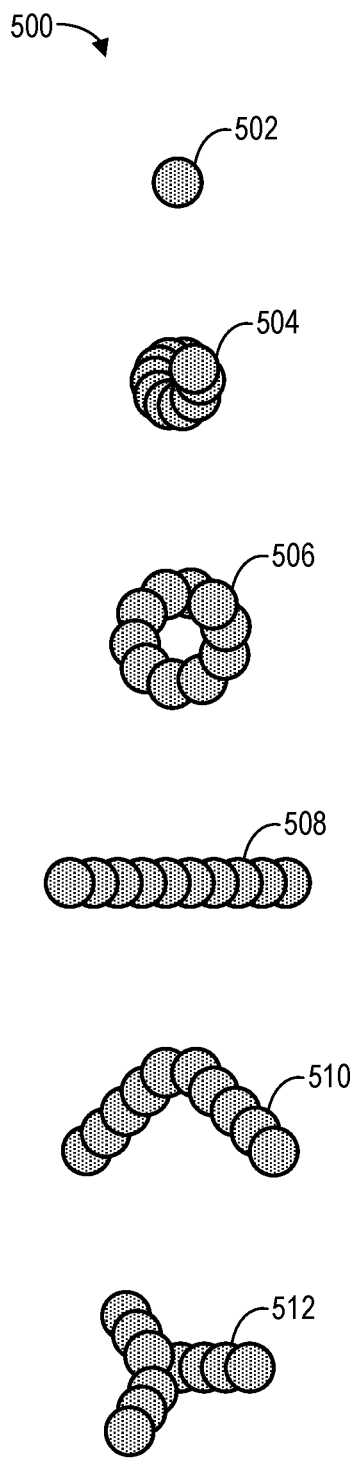
FIG. 5 shows examples of clusters of laser beams with different shapes on the surface of a powder bed in accordance with some embodiments.

FIG. 5 shows examples of clusters 500 of laser beams with resulting thermal profiles that may be favorable for the local geometry of the structure 110 (FIG. 6), in accordance with some embodiments. Some examples of local geometries include overhangs, thin walls and/or features, and areas where the residual stress of the previously melted material needs to be relieved or controlled. The shapes shown in FIG. 5 are the shapes of the clusters 500 on the surface of the powder bed 108, and thus also the shapes of selected portions of the surface of the powder bed 108 to which the clusters 500 are directed (and thus on which the clusters 500 are incident), to produce corresponding melt pools. In some embodiments, laser beams are clustered to form a spot 502, with the clustered laser beams overlapping entirely to provide a small spot size. In some embodiments, laser beams are clustered in a partially overlapping manner to form a circle 504 or a ring 506 to approximate a doughnut intensity profile (e.g., as for the doughnut-shaped laser-beam cluster 404, FIG. 4). The laser beams are not incident on a center area in the ring 506. In some embodiments, laser beams are clustered in a partially overlapping manner to form a line 508, two lines 510 that join at an angle, or three lines 512 that join at respective angles. Other examples of clusters are also possible; in general, clusters of arbitrary shapes may be created. The component laser beams may also be adjusted (e.g., by adjusting their position, temporal-dependent delivered power, and or spot size within the cluster) to engineer particular intensity and thermal profiles for a given shape. The speed with which a cluster is scanned over the surface of the powder bed 108 may be varied, and the shape of a cluster may be adjusted as the cluster is scanned over the surface of the powder bed 108 to, for example, adapt to the changing local geometry of the structure 110 as the cluster is moved along the scan path.

FIG. 6 is a schematic illustration of a 3D metal printer 600 used to fabricate metal structures 110 in accordance with some embodiments. The 3D metal printer 600 includes a reservoir 102 that stores powdered metal 104. A roller 106, rake, or other mechanism moves powdered metal 104 from the reservoir 102 to a powder bed 108, depositing the powdered metal 104 in the powder bed 108 in layers, one layer at a time. A piston 112 beneath the reservoir 102 moves up after a layer of powdered metal 104 has been removed from the reservoir 102, to decrease the size of the reservoir 102 so the powdered metal 104 remains at the surface of the reservoir 102. A piston 114 beneath the powder bed 108 moves down to make space in the powder bed 108 for powdered metal 104 to be deposited.

The 3D metal printer 600 includes a plurality of lasers 602 that generate respective laser beams 604, which are clustered into a cluster of laser beams 608 that is steered using a scanner 606. (The optical paths of the laser beams 604 between the lasers 602 and scanner 606 may include optical components that are not shown for simplicity.) The scanner 606 steers the cluster 608 onto selected portions of the surface of a powder bed 108 to melt powdered metal 104 in the selected portions, thus creating melt pools at the selected portions of the powder-bed surface. The melt pools solidify into solid metal once they cool, creating a structure 110. (The specified portions are specified in build settings that are determined based on a computer model of the structure 110.)

In some embodiments, the scanner 606 includes a two-axis steering mirror (e.g., a mirror galvanometer, commonly referred to as a galvo mirror) (e.g., a voice-coil-driven steering mirror) or multiple (e.g., a pair of) single-axis steering mirrors. In some embodiments, the scanner 606 includes two or more steering mirrors (e.g., by analogy to the first steering mirror 1016 and second steering mirror 1018, FIG. 10), each of which may be a two-axis steering mirror (e.g., a two-axis galvo mirror or two-axis voice-coil-driven steering mirror). In some embodiments, the plurality of lasers 602 is external to a processing chamber 610 that includes the powder bed 108. The laser beams 604 (e.g., the cluster 608) may be introduced into the processing chamber 610 through a ceiling 612 of the processing chamber 610 (e.g., through a transmission window in an aperture in the ceiling 612). The ceiling 612 may be flat or domed, or have any other suitable shape. The temporal-dependent delivered power of each of the lasers 602 may be independently controlled. The lasers 602 may be operable at powers such as for the laser beams 302 (FIG. 3B) or 312 (FIG. 3C).

Figure 7A:
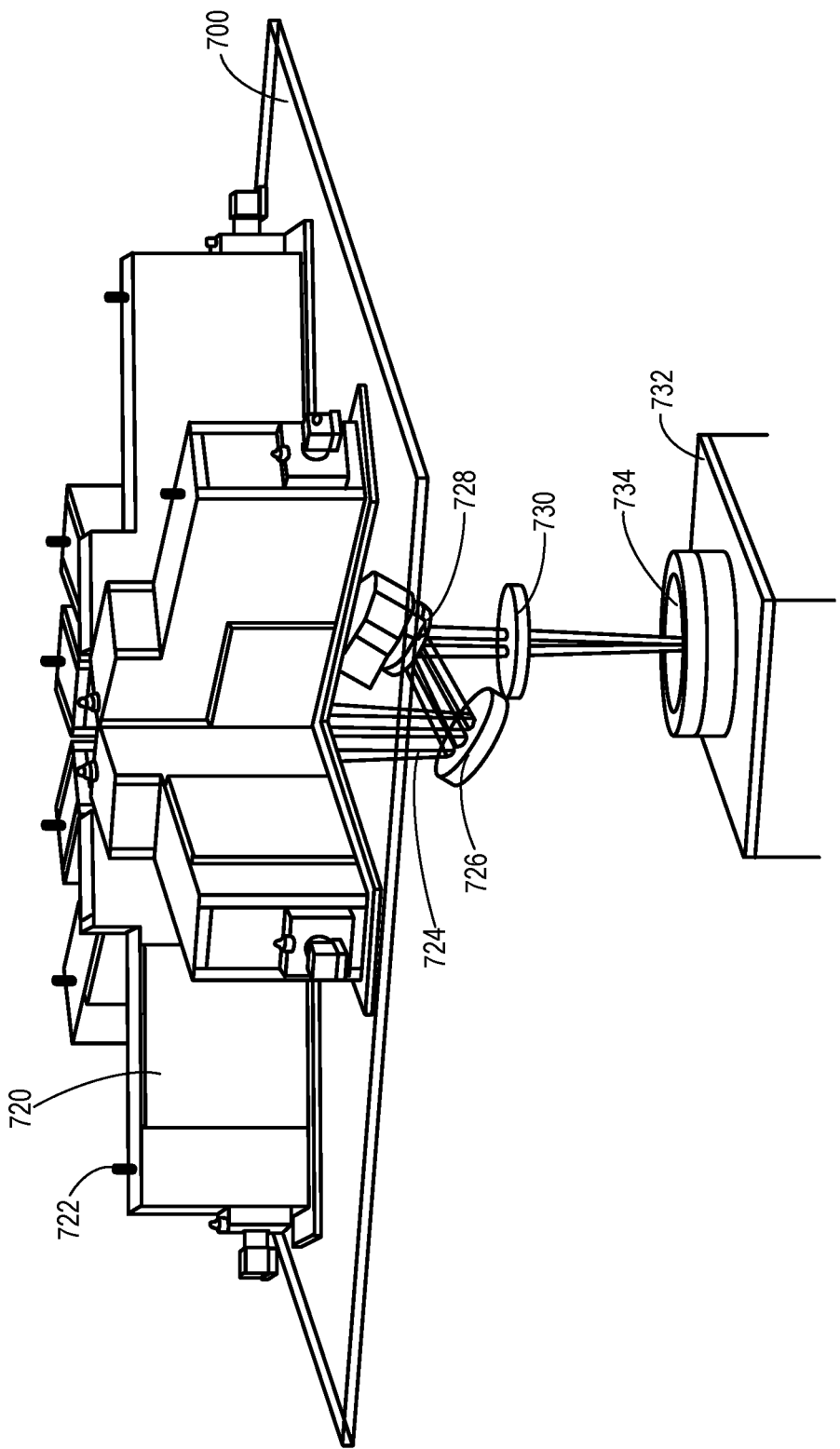
FIGS. 7A-7B show examples of an optical platform with a plurality of lenses and mirrors that may be used in the 3D metal printer of FIG. 6 in accordance with some embodiments.
Figure 7B:
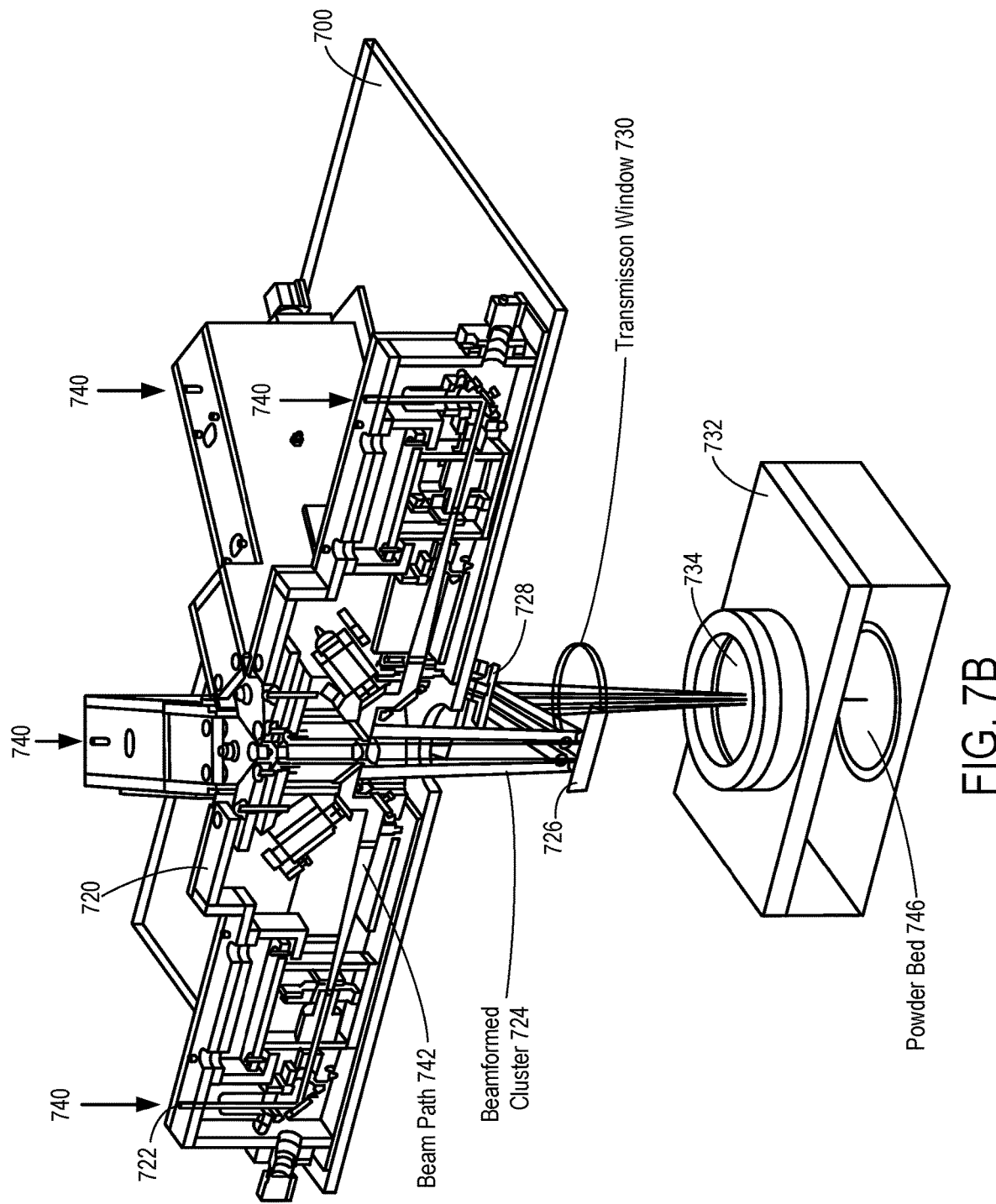

FIGS. 7A and 7B show an example of the 3D metal printer 600 (FIG. 6) in accordance with some embodiments. A plurality of optical modules 720 is mounted on an optical platform 700 situated above a processing chamber 732 (e.g., processing chamber 610, FIG. 6). Each optical module 720 includes a connector 722 (e.g., a QCS connector or QBH connector) to receive a respective laser beam 740 (FIG. 7B) from a respective laser (not shown) (e.g., a respective laser 602, FIG. 6, which may be a fiber laser with an integrated connector, such as a QCS connector or QBH connector). The optical modules 720 includes lenses and mirrors to provide respective beam paths 742 (FIG. 7B) for the laser beams 740, which are routed through the beam paths 742 into a cluster 724 of laser beams 740. Respective lenses in the respective beam paths 742 may be adjusted along the beam path (i.e., in a direction parallel to the optical axis of the beam path) (e.g., using a voice-coil, geared, or belt-driven linear actuator) or have their shape adjusted to change the focus (e.g. using piezo-driven deformable mirrors/lenses or deformable refractive surfaces). Respective mirrors at the ends of the beam paths 742 in the optical modules 720 cluster the laser beams together into the cluster 724 (e.g., cluster 608, FIG. 6; cluster 300, FIG. 3B), and direct the cluster 724 downward through an aperture in the optical platform 700. A mirror 726 (e.g., a fixed mirror) below the optical platform 700 directs the cluster 724 to a series of one or more scanning mirrors for multi-axis steering control 728 (e.g., a two-axis steering mirror) below the optical platform 700. The steering mirror 728 directs the cluster 724 to specified portions of the surface of a powder bed 746 (FIG. 7B) situated in the processing chamber 732. The cluster 724 is introduced into the processing chamber 732 through a transmission window 730. The transmission window 730 may be situated in an aperture 734 in the ceiling of the processing chamber 732. In the example of FIGS. 7A and 7B, the transmission window 730 is shown above the aperture 734 to indicate that the transmission window 730 may be moved higher than the position of a transmission window in a stock processing chamber 732, in accordance with some embodiments.

Figure 8A:
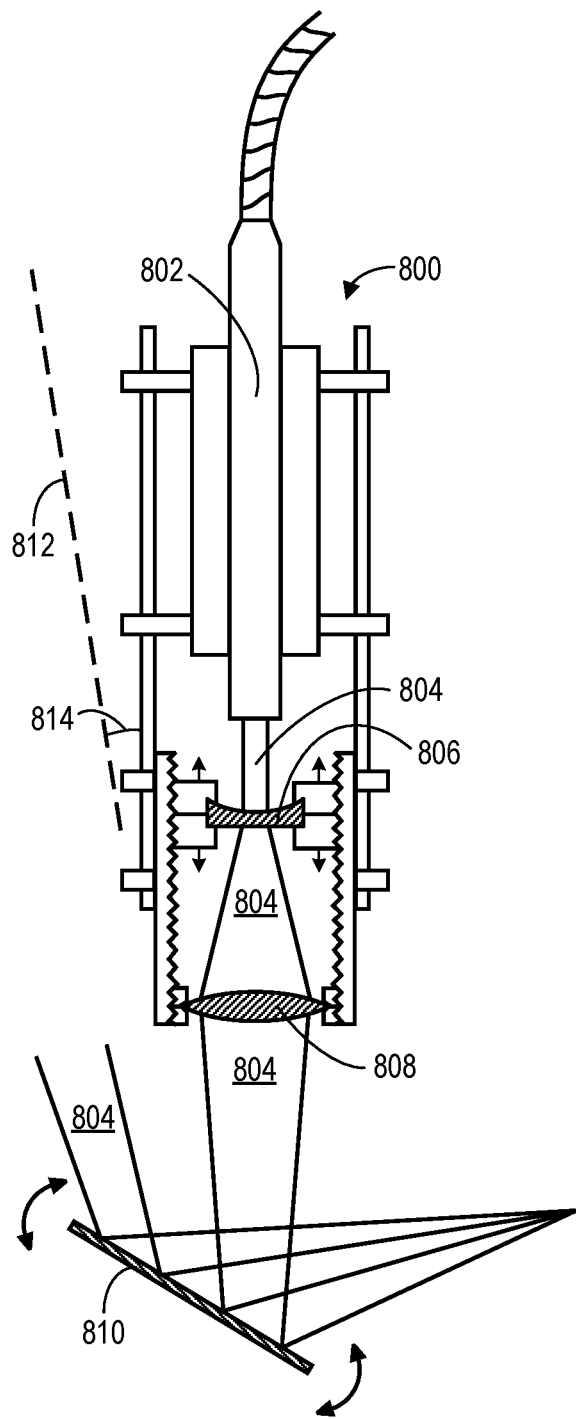
FIG. 8A shows an optical module for a respective laser beam of a plurality of laser beams generated in a 3D metal printer in accordance with some embodiments.

FIG. 8A shows an optical module 800 for a respective laser beam 804 of a plurality of laser beams generated in a 3D metal printer (e.g., the printer 600, FIG. 6) in accordance with some embodiments. The optical module 800 is situated along the optical path of the respective laser beam 804 between the laser (not shown) that generates the respective laser beam 804 (e.g., a laser 602, FIG. 6) and a scanner 810 (e.g., the scanner 606, FIG. 6) (e.g., a series of one or more scanning mirrors). The optical module 800 includes a fiber coupling 802 to receive the respective laser beam 804, a focus control lens 806, and an objective lens 808. The objective lens 808 focuses the respective laser beam 804. The focus control lens 806 has an adjustable position along the optical axis of the respective laser beam 804 (e.g., adjustable using a voice coil actuator) (as indicated by arrows in FIG. 8A) or has the ability to deform reflective or refractive optical surfaces to change the resulting focal length of the system. Adjusting this position adjusts a spot size of the respective laser beam 804 on the surface of the powder bed 108. Multiple optical modules 800 provide respective laser beams 804 (a second laser beam 804 is shown as an example in FIG. 8) to the scanner 810 to steer the laser beams 804 onto selected portions of the surface of the powder bed 108. In some embodiments, the scanner 810 is a two-axis steering mirror or a combination (e.g., a pair) of single-axis steering mirrors. (Additional optical components may be present between each optical module 800 and the scanner 810 and/or between the scanner 810 and the surface of the powder bed 108.) In some embodiments, the multiple optical modules 800 are mounted on the ceiling 612 of the processing chamber 610. The lasers 802 may be operable at powers such as for the laser beams 302 (FIG. 3B).

Figure 8B:
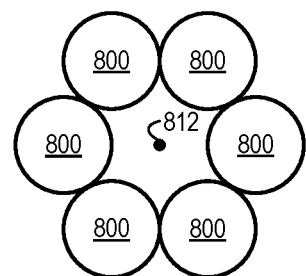
FIGS. 8B and 8C show arrangements of pluralities of the optical module of FIG. 8A in accordance with some embodiments.
Figure 8C:
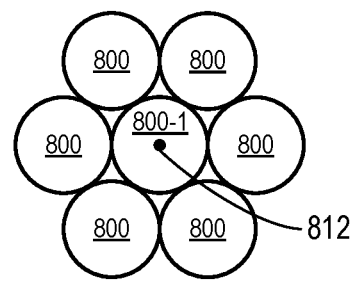

The optical module 800 is situated at an angle 814 with respect to an axis 812. In some embodiments, multiple optical modules 800 are arranged (e.g., evenly arranged) about the axis 812, as shown in FIG. 8B in accordance with some embodiments. Each of the multiple optical modules 800 in FIG. 8B may be situated at substantially the same angle 814 with respect to the axis 812 (e.g., to within manufacturing tolerances). In some other embodiments, as shown in FIG. 8C, a first optical module 800-1 is situated along (e.g., centered on) the axis 812, while additional optical modules 800 are arranged (e.g., evenly arranged) about the axis 812, and thus about the first optical module 800-1. Each of the additional optical modules 800 in FIG. 8C may be situated at substantially the same angle with respect to the axis 812 (e.g., to within manufacturing tolerances). The arrangements of optical modules 800 in FIGS. 8B and 8C have the effect of clustering the corresponding laser beams 804. Other arrangements of optical modules 800 besides those of FIGS. 8A and 8B are possible.

Figure 10:
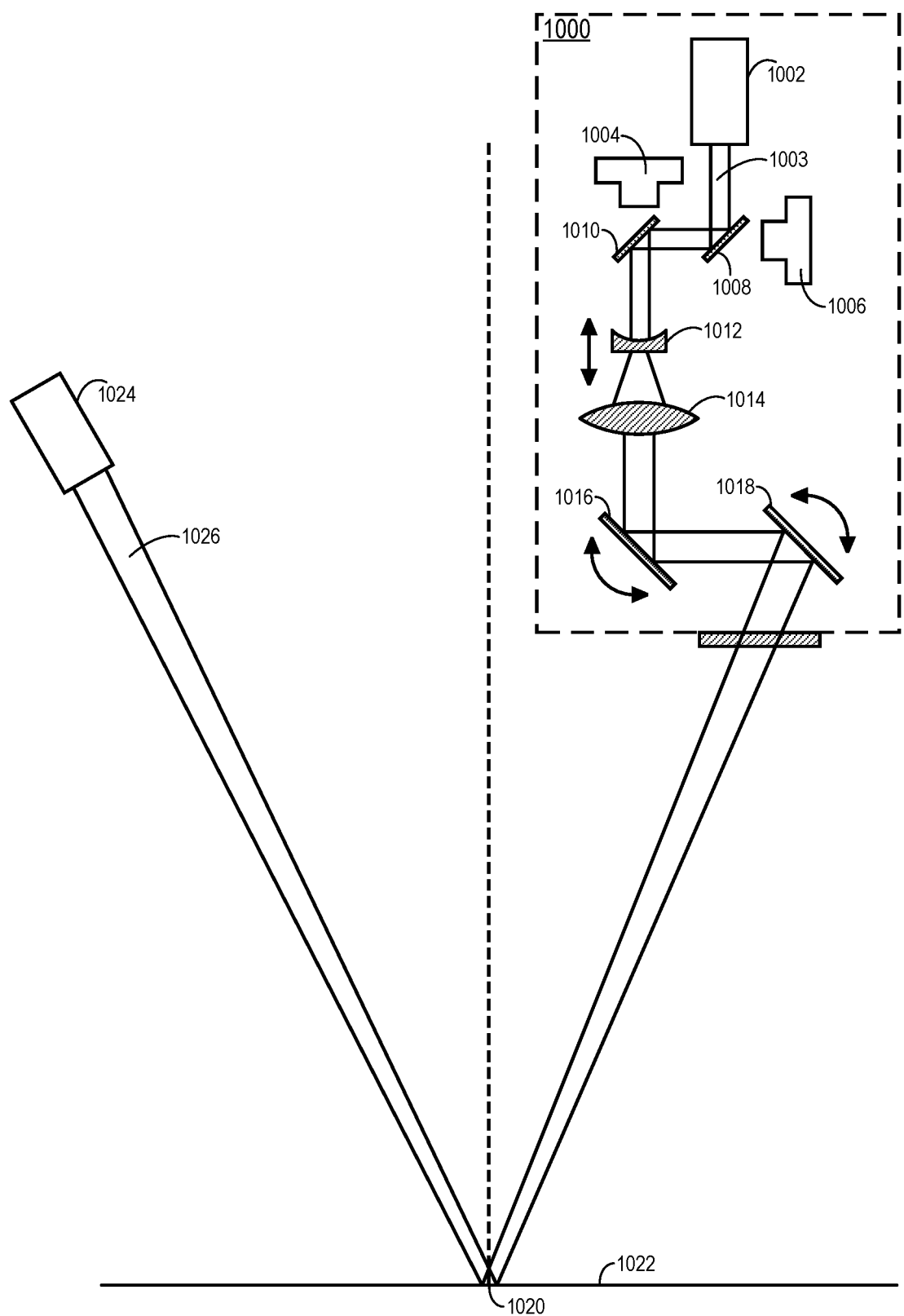
FIG. 10 shows a portion of a 3D metal printer that includes an optical module to independently steer a laser beam and also includes one or more targeting lasers, in accordance with some embodiments.

In some embodiments, a 3D metal printer (e.g., 3D metal printer 600, FIG. 6) with optical modules 800 also includes one or more targeting lasers (e.g., analogous to a targeting laser 1024, FIG. 10). A targeting laser generates a targeting laser beam, which is directed to a selected portion (i.e., a specified area) on the powder-bed surface. A digital camera (e.g., a CMOS camera) (e.g., analogous to a digital camera 1004 or 1006, FIG. 10) detects the reflection of the targeting laser beam and determines its location. The detected location of the reflection is used to improve the accuracy with which the scanner 810 steers the laser beams 804. For example, the reflection of the targeting laser beam is detected at certain pixels in the digital camera, with each pixel corresponding to a particular location on the powder-bed surface. Given the known relationship between pixels and locations on the powder-bed surface, the scanner 810 can adjust its steering (e.g., through actuation of a series of one or more scanning mirrors for multi-axis steering control) of the laser beams 804 to improve its accuracy. In some embodiments, the targeting laser beam has a different wavelength than the wavelength(s) of the laser beams 804, and a dichroic mirror (e.g., in a respective optical module) provides the targeting laser beam to the digital camera.

Figure 9:
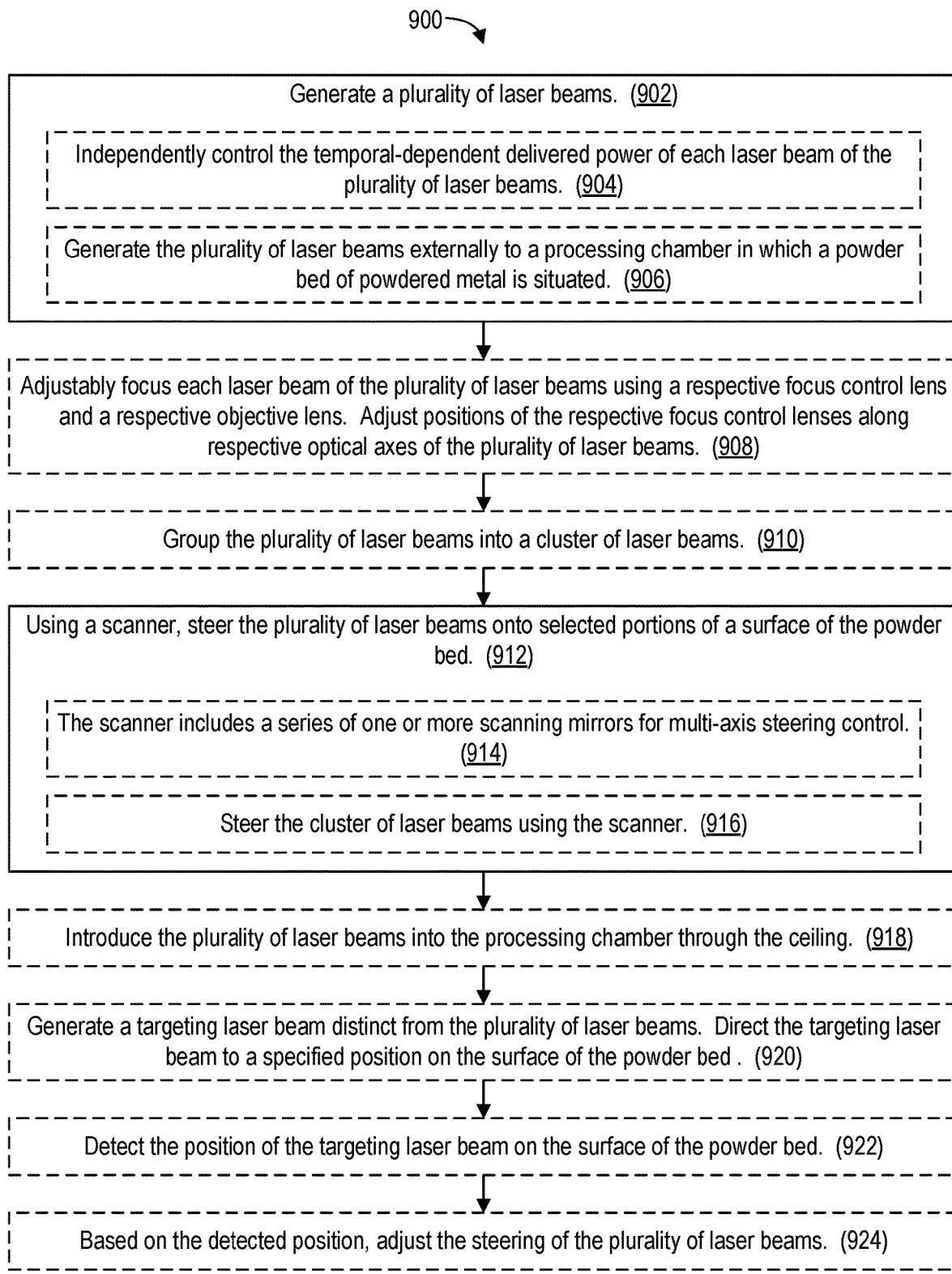
FIG. 9 is a flowchart showing a method of performing metal additive manufacturing in which a single scanner is used to steer multiple laser beams onto selected portions of a powder-bed surface, in accordance with some embodiments.

FIG. 9 is a flowchart showing a method 900 of performing metal additive manufacturing in accordance with some embodiments. In the method 900, a plurality of laser beams (e.g., laser beams 302, FIG. 3B; 604, FIG. 6; 804, FIG. 8A) is generated (902). A scanner (e.g., scanner 606, FIG. 6; 810, FIG. 8) is used (912) to steer the plurality of laser beams onto selected portions of a surface of a powder bed (e.g., powder bed 108, FIG. 6). A single scanner is thus used to steer multiple laser beams onto the selected portions of the powder-bed surface. In some embodiments, the scanner includes (914) a series of one or more scanning mirrors for multi-axis steering control.

In some embodiments, generating (902) the plurality of laser beams includes independently controlling (904) the temporal-dependent delivered power of each laser beam of the plurality of laser beams. Independently controlling the temporal-dependent delivered power of each laser beam may include temporally varying the delivered power of respective laser beams. In some embodiments, each laser beam of the plurality of laser beams has a power of 500 W or less, or 300 W or less (e.g., 100-300 W or 200-300 W), or 200 W or less (e.g., 100-200 W), or 100 W or less. Examples of the number of laser beams in the plurality of laser beams include, without limitation, two or more laser beams (e.g., 2-5 laser beams), five or more laser beams (e.g., 5-10 laser beams), 10 or more laser beams (e.g., 10-20 laser beams), or 20 or more laser beams (e.g., more than 20 laser beams).

In some embodiments, the plurality of laser beams is generated (906) externally to a processing chamber (e.g., processing chamber 610, FIG. 6) in which a powder bed of powdered metal is situated and is introduced (918) into the processing chamber through the ceiling (e.g., ceiling 612, FIG. 6). For example, the plurality of laser beams is generated as shown in FIGS. 7A-7B. The plurality of laser beams may be clustered (e.g., as shown in FIG. 7B) before being introduced into the processing chamber through the ceiling.

In some embodiments, each laser beam of the plurality of laser beams is adjustably focused (908) using a respective focus control lens (e.g., lens 806, FIG. 8A) and a respective objective lens (e.g., lens 808, FIG. 8A). This focusing includes adjusting positions of the respective focus control lenses along respective optical axes of the plurality of laser beams. In some embodiments, translational control of one or more lenses may be used to adjust the location of a spot within a cluster, wherein the spot corresponds to a respective laser beam.

In some embodiments, the plurality of laser beams is grouped (910) into a cluster of laser beams. This grouping may be performed on a ceiling (e.g., ceiling 612, FIG. 6) of the processing chamber in which the powder bed is situated, or may be performed before the plurality of laser beams is introduced into the processing chamber (e.g., through the ceiling). In some embodiments, this grouping is performed using a plurality of mirrors, each of which positions a respective laser beam in the cluster (e.g., as shown in FIG. 7B). The cluster of laser beams is steered (916) onto the selected portions of the surface of the powder bed in step 912.

In some embodiments, the method 900 further includes generating (920) a targeting laser beam (e.g., by analogy to the targeting laser beam 1026, FIGS. 10-11), which is distinct from the plurality of laser beams. The targeting laser beam is directed to a specified position on the surface of the powder bed. The position of the targeting laser beam on the surface of the powder bed is detected (922) (e.g., using a digital camera that receives the reflected targeting laser beam through a dichroic mirror, by analogy to FIG. 10). Based on the detected position, the steering of the plurality of laser beams is adjusted (924) to maintain proper alignment.

Steps 902, 908, 910, 912, and 918 as shown in FIG. 9 are ordered from upstream to downstream along the laser-beam paths in accordance with some embodiments. The order of the steps in FIG. 9 does not imply a chronological order in which the steps are performed. To the contrary, the steps of the method 900 may be performed in a simultaneous or overlapping manner.

FIG. 10 shows a portion of a 3D metal printer with an optical module 1000 that generates and independently steers a laser beam 1003 (e.g., one of the laser beams 312, FIG. 3C) in accordance with some embodiments. The optical module 1000 includes a laser 1002 that generates the laser beam 1003. Alternatively, the laser 1002 may be external to the optical module 1000 (e.g., with the laser beam 1003 delivered to the optical module 1000 through fiber delivery). The laser 1002 may be operable at powers such as for the laser beams 312 (FIG. 3C). Lenses in the optical module 1000, including a focus control lens 1012 and an objective lens 1014, focus the laser beam 1003. The focus control lens 1012 has an adjustable position along the optical axis of the laser beam 1003 (e.g., in an analogous manner as the focus control lens 806, FIG. 8A). Adjustment of the position of the focus control lens 1012 allows a spot size of a spot 1020 of the laser beam 1003 on the surface 1022 of a powder bed (e.g., powder bed 108 of the 3D metal printer 1100, FIG. 11) to be controlled. In some embodiments, dichroic mirrors 1008 and 1010 reflect the laser beam 1003 and provide the laser beam 1003 from the laser 1002 to the focus control lens 1012. The optical module 1000 further includes a series of one or more scanning mirrors for multi-axis steering control. For example, the optical module 1000 may include a scanner comprising a first steering mirror 1016 (e.g., a galvo mirror or voice-coil-driven mirror) and a second steering mirror 1018 (e.g., a galvo mirror or voice-coil-driven mirror). The first steering mirror 1016 steers the laser beam 1003, as received from the objective lens 1014, onto the second steering mirror 1018, which steers the laser beam 1003 onto selected portions of the powder-bed surface 1022.

A 3D metal printer may include a plurality of optical modules 1000, each of which may generate and independently steer a respective laser beam 1003. Respective instances of laser beams 1003 may be steered into laser-beam clusters on the powder-bed surface 1022 (e.g., in accordance with FIG. 3C, 4, or 5).

In some embodiments, the 3D metal printer of FIG. 10 further includes one or more targeting lasers 1024. A targeting laser 1024 generates a targeting laser beam 1026, which is directed to a selected portion (i.e., a specified area) on the powder-bed surface 1022. A digital camera 1004 or 1006 (e.g., a CMOS camera) in an optical module 1000 detects the reflection from the targeting laser beam 1026 and determines its location. The optical module 1000 uses the detected location of the reflection of the targeting laser beam 1026 on the powder-bed surface 1022 to improve the accuracy with which the optical module 1000 steers the laser beam 1003. For example, the reflection of the targeting laser beam 1026 is detected at certain pixels in the camera 1004 or 1006, with each pixel corresponding to a particular location on the powder-bed surface 1022. Given the known relationship between pixels and locations on the powder-bed surface 1022, the optical module can adjust its steering (e.g., through actuation of the first steering mirror 1016 and/or second steering mirror 1018) of the laser beam 1003 to improve its accuracy.

In some embodiments, the targeting laser beam 1026 has a different wavelength than the wavelength of the laser beam 1003. A dichroic mirror 1010 or 1008 transmits the targeting laser beam 1026 to a respective camera 1004 or 1006 while reflecting the laser beam 1003. Until reaching a transmissive dichroic mirror, the targeting laser beam 1026 may travel the same optical path as the laser beam 1003 but in reverse.

Figure 11:
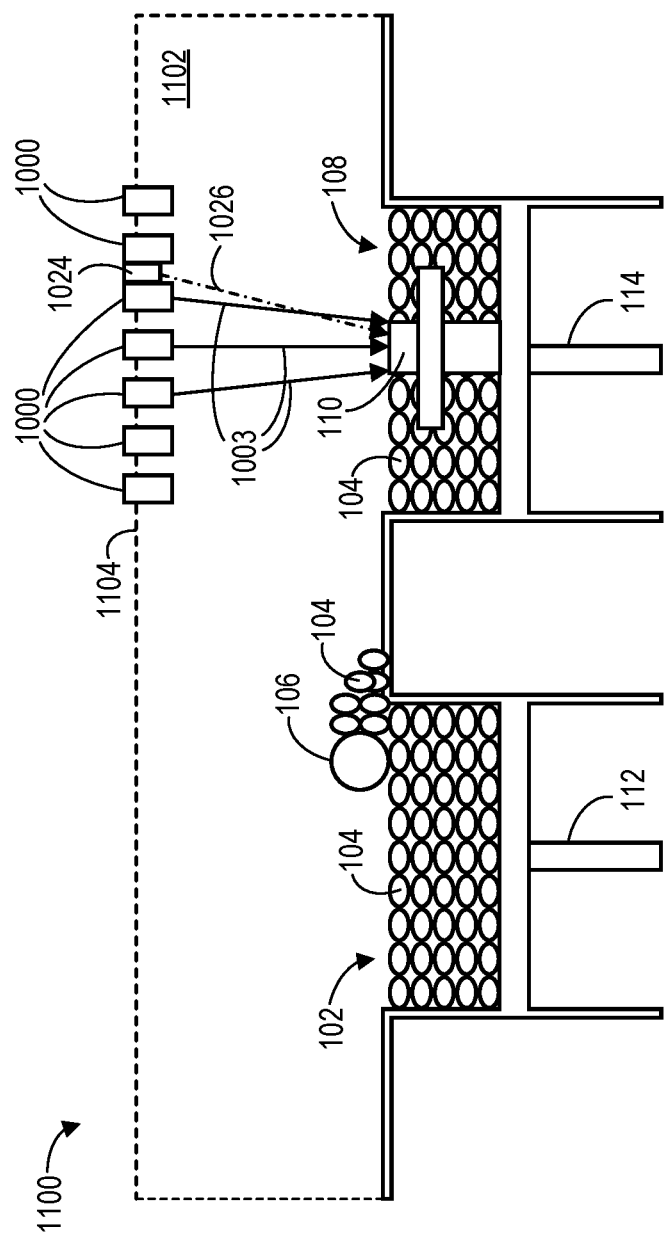
FIG. 11 is a schematic illustration of a 3D metal printer with a plurality of optical modules having respective lasers and scanners in accordance with some embodiments.

FIG. 11 is a schematic illustration of a 3D metal printer 1100 with a plurality of optical modules 1000 in accordance with some embodiments. The optical modules 1000 may be situated on a ceiling 1104 of a processing chamber 1102. The ceiling 1104, like the ceiling 612 (FIG. 6) may be flat or domed, or have any other suitable shape. For example, the optical modules 1000 may be situated in an array (e.g., a close-packed array) on the ceiling 1104. In some embodiments, there are 50 or more, or 100 or more, or 150 or more, or 200 or more optical modules 1000 (e.g., 50-100, 100-150, 150-200, or 200-250 optical modules 1000) on the ceiling 1104 (e.g., in the array on the ceiling). One or more targeting lasers 1024 may be situated on the ceiling 1104 in respective spaces between optical modules 1000 (e.g., in the array).

Figure 12:
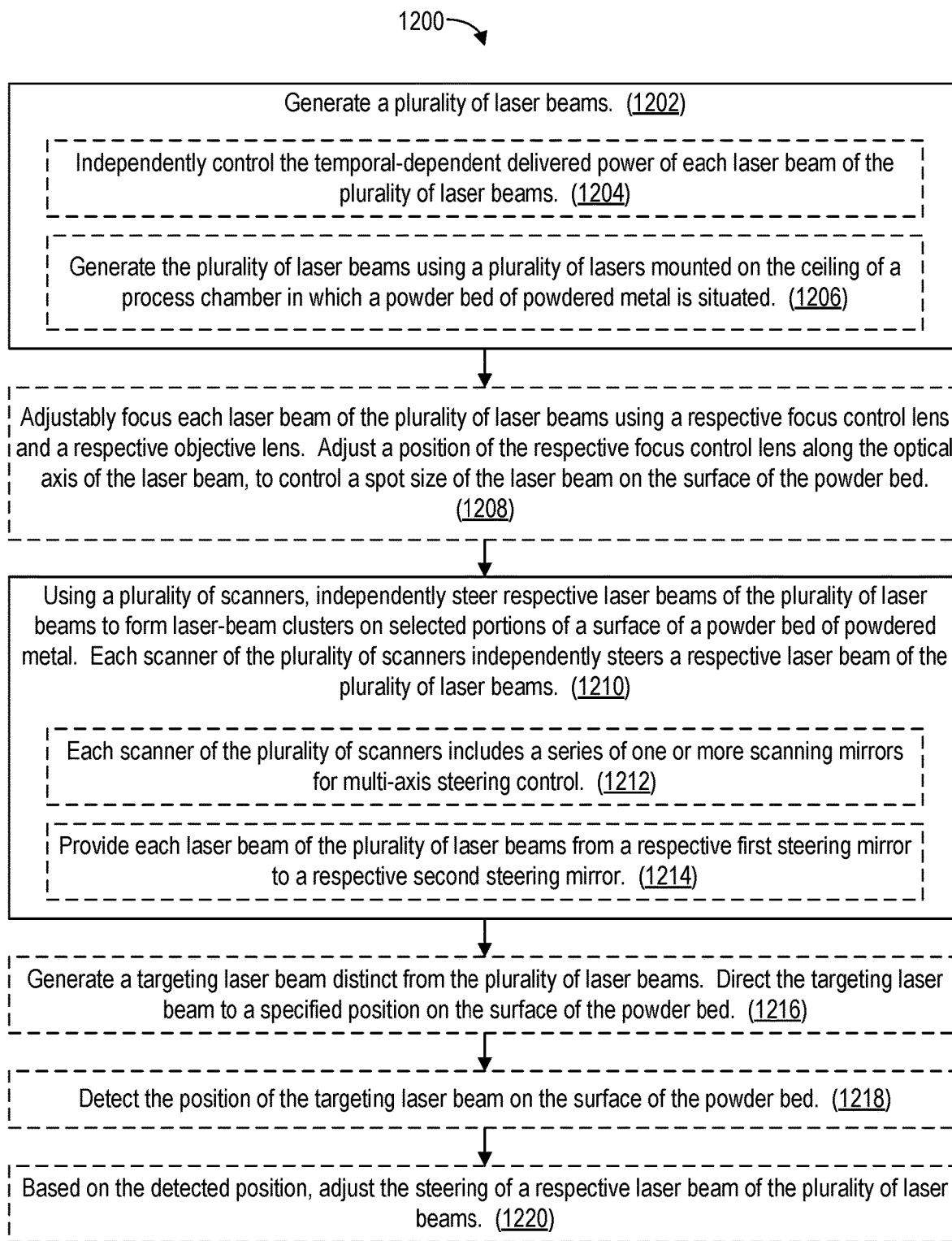
FIG. 12 is a flowchart showing a method of performing metal additive manufacturing in which laser beams are independently steered to form laser-beam clusters on selected portions of a powder-bed surface, in accordance with some embodiments.

FIG. 12 is a flowchart showing a method 1200 of performing metal additive manufacturing in accordance with some embodiments. In the method 1200, a plurality of laser beams (e.g., laser beams 312, FIG. 3C; 1003, FIGS. 10-11) is generated (1202). Using a plurality of scanners (e.g., respective scanners comprising respective first steering mirrors 1016 and second steering mirrors 1018, FIG. 10), respective laser beams of the plurality of laser beams are independently steered (1210) to form laser-beam clusters on selected portions of a surface (e.g., surface 1022, FIG. 10) of a powder bed (e.g., powder bed 108, FIG. 11) of powdered metal. Each scanner of the plurality of scanners independently steers a respective laser beam of the plurality of laser beams. In some embodiments, each scanner of the plurality of scanners includes (1212) a series of one or more scanning mirrors for multi-axis steering control (e.g., the first steering mirror 1016 and/or second steering mirror 1018, FIG. 10). In some embodiments, each scanner of the plurality of scanners includes multiple (e.g., a pair of) single-axis steering mirrors. In some embodiments, steering the respective laser beams includes providing (1214) each laser beam of the plurality of laser beams from a respective first steering mirror (e.g., first steering mirror 1016) to a respective second steering mirror (e.g., second steering mirror 1018).

In some embodiments, generating (1202) the plurality of laser beams includes independently controlling (1204) the temporal-dependent delivered power of each laser beam of the plurality of laser beams. Independently controlling the temporal-dependent delivered power of each laser beam may include temporally varying the delivered power of respective laser beams. In some embodiments, each laser beam of the plurality of laser beams has a power of 500 W or less, or 300 W or less (e.g., 100-300 W or 200-300 W), or 200 W or less (e.g., 100-200 W), or 100 W or less.

In some embodiments, the plurality of laser beams is generated (1206) using a plurality of lasers mounted on the ceiling of a processing chamber in which the powder bed is situated (e.g., lasers 1002 mounted in optical modules 1000 on the ceiling 1104, FIGS. 10-11).

Each laser beam of the plurality of laser beams may be adjustably focused (1208) using a respective focus control lens (e.g., lens 1012, FIG. 10) and a respective objective lens (e.g., lens 1014, FIG. 10). This focusing includes adjusting a position of the respective focus control lens along the optical axis of the laser beam, to control a spot size (e.g., of a spot 1020, FIG. 10) of the laser beam on the surface of the powder bed. In some embodiments, translational control of one or more lenses may be used to adjust the location of a spot within a cluster, wherein the spot corresponds to a respective laser beam.

In some embodiments, the method 1200 further includes generating (1216) a targeting laser beam (e.g., targeting laser beam 1026, FIGS. 10-11), which is distinct from the plurality of laser beams. The targeting laser beam is directed to a specified position on the surface of the powder bed. The position of the targeting laser beam on the surface of the powder bed is detected (1218) (e.g., using a camera 1004 or 1006, FIG. 10). Based on the detected position, the steering of a respective laser beam of the plurality of laser beams is adjusted (1220). In some embodiments, the position of a respective laser beam (i.e., the spot for that laser beam within the cluster) is adjusted at least in part through translational control of a respective lens position.

The order of the steps in FIG. 12 does not imply a chronological order in which the steps are performed. To the contrary, the steps of the method 1200 may be performed in a simultaneous or overlapping manner. Steps 1202, 1208, and 1210 as shown in FIG. 12 are ordered from upstream to downstream along laser-beam paths in accordance with some embodiments.

Figure 13:
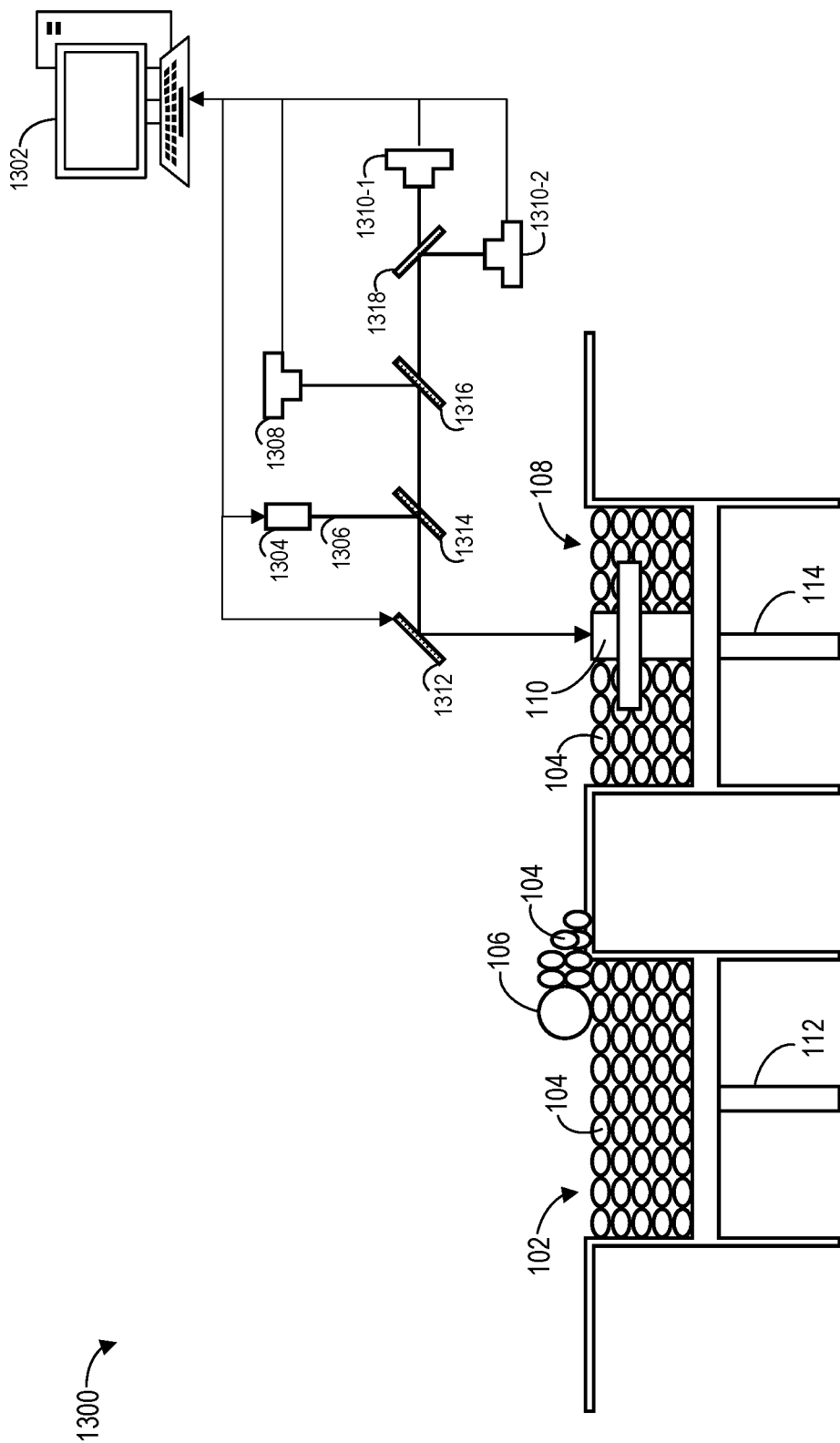
FIG. 13 is a schematic illustration of a 3D metal printer that is controlled by a computer based on feedback from sensors in the 3D metal printer in accordance with some embodiments.

FIG. 13 is a schematic illustration of a 3D metal printer 1300 that is controlled by a computer 1302 based on feedback from sensors in the 3D metal printer 1300 in accordance with some embodiments. The 3D metal printer 1300 includes a plurality of lasers 1304 (a single laser 1304 is shown for simplicity) that produce laser beams 1306, which may be clustered on the surface of the powder bed 108. The 3D metal printer 1300 may be an example of the 3D metal printer 600 (FIG. 6) or 1100 (FIG. 11). In some embodiments, the sensors in the 3D metal printer 1300 include a digital camera 1308 (e.g., a CMOS camera) and/or one or more pyrometers 1310. (Two pyrometers 1310-1 and 1310-2 are shown in the example of FIG. 13.) The 3D metal printer has optical components including a scanner 1312 and dichroic mirrors 1314, 1316, and 1318 to provide light reflected from the surface of the powder bed 108 to the digital camera 1308 and/or pyrometer(s) 1310. The 3D metal printer 1300 may include other optical components (e.g., lenses for focusing the laser beams 1306), which are not shown in FIG. 13 for simplicity. The computer 1302 may use data from the sensors to adjust operation of the 3D metal printer 1300 (e.g., operation of lasers 1304, scanners 1312, and/or other components, such as adjustable focus control lenses) and/or operation of other 3D metal printers (e.g., other instances of the 3D metal printer 1300). Adjustments based on sensor data may be made during ongoing fabrication of a particular structure 110 and/or during subsequent fabrication of another structure 110.

The camera 1308 images the surface of the powder bed 108 or portions thereof during fabrication of a structure 110. These images are provided to the computer 1302, which processes the images to identify characteristics of the surface of the powder bed 108. For example, the computer 1302 processes images from the camera 1308 to determine a size (e.g., area) and/or shape (e.g., aspect ratio) of a melt pool (or of multiple melt pools, for example if different clusters of laser beams 1306 are simultaneously generated and directed to different selected portions of the surface of the powder bed 108). The camera 1308 may be used for relative or absolute temperature measurements (e.g., measurements of temperature profiles and/or temperature variation).

The one or more pyrometers 1310 detect temperatures of the surface of the powder bed 108 or portions thereof and provide the detected temperatures to the computer 1302. For example, the pyrometer(s) 1310 sense the temperature of a melt pool and/or regions of the powder-bed surface adjacent to a melt pool. In some embodiments in which different clusters of laser beams 1306 are simultaneously directed to, and thus incident on, different selected portions of the surface of the powder bed 108, the pyrometer(s) 1310 may sense the temperatures of the multiple corresponding melt pools and/or adjacent regions. In 3D metal printers 1300 with multiple pyrometers, each pyrometer may have a center band at a distinct wavelength. For example, a first pyrometer 1310-1 may have a first center band (e.g., 850 nm) and a second pyrometer 1310-2 may have a second center band (e.g., 650 nm).

Figure 14:
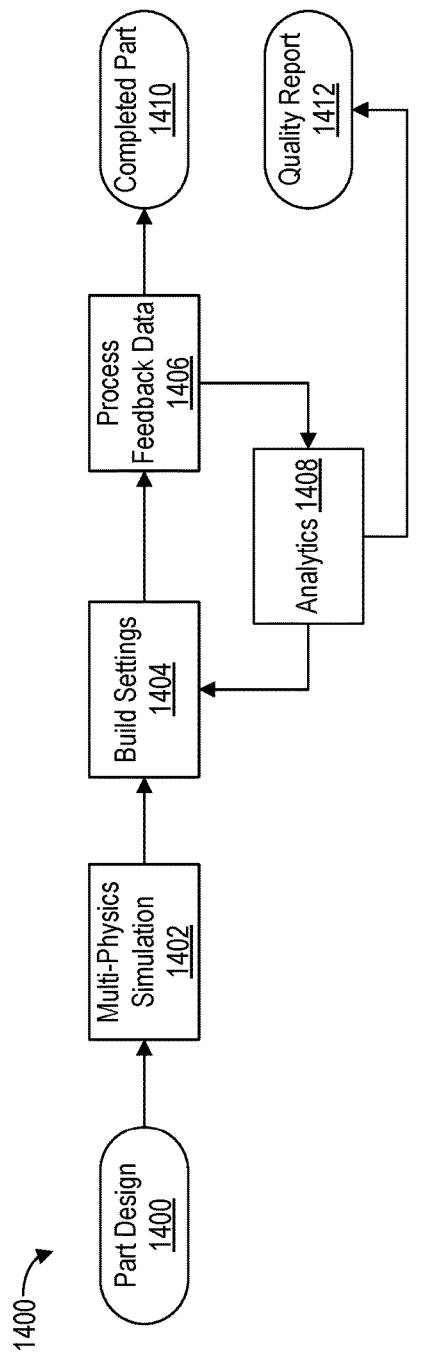
FIG. 14 shows a flow of data corresponding to operation of a 3D metal printer with sensor feedback, such as the 3D metal printer of FIG. 13, in accordance with some embodiments.

FIG. 14 shows a flow of data 1400 corresponding to operation of a 3D metal printer with sensor feedback (e.g., the 3D metal printer 1300, FIG. 13), in accordance with some embodiments. A design 1400 of a metal part (e.g., a structure 110, FIGS. 6, 11, and 13) is specified in a digital file. A multi-physics simulation 1402 is performed to determine build settings 1404 for fabrication of the part in a 3D metal printer. The build settings 1404, which may be stored on the computer 1302 (FIG. 13), specify how the 3D metal printer is to operate when fabricating the metal part. The build settings 1404 thus include control settings for lasers, scanners, and/or focus control lenses. Process feedback data 1406 from sensors in the 3D metal printer (e.g., from the camera 1308 and/or pyrometer(s) 1310, FIG. 13) are collected and analyzed using analytics 1408. For example, process feedback data 1406 are provided to the computer 1302, where the analytics 1408 analyze the process feedback data 1406. The analytics 1408 identify changes to be made to the build settings 1404 based on the process feedback data 1406. For example, the build settings 1404 may be modified to reduce or eliminate a difference between the detected size and/or shape of a melt pool and an expected size and/or shape of the melt pool. In another example, the build settings 1404 may be modified in response to a determination that temperatures detected by pyrometer(s) 1310, or statistics calculated based on detected temperatures, satisfy one or more criteria (e.g., are higher or lower than expected in a particular portion of the powder-bed surface).

A quality report 1412 for the completed part 1410 is generated based on the analytics 1408. In some embodiments, the quality report 1412 indicates whether the process feedback data 1406 satisfied quality criteria. For example, the quality report indicates whether and/or what changes were made to the build settings 1404 to ensure quality compliance for the completed part 1410, and confirms that the changes were successful in achieving quality compliance. In some embodiments, the quality report 1412 does not include the process feedback data 1406. In some embodiments, the quality report 1412 includes statistics regarding the process feedback data 1406, as calculated by the analytics 1408. In some embodiments, the quality report 1412 includes statistics regarding the process feedback data 1406, as calculated by comparing the process data to a known qualification build or previous history of similar or identical builds (e.g., build(s) of previous instances of the structure 110). The quality report 1412 may be provided to the customer along with the completed part 1410.

Figure 15:
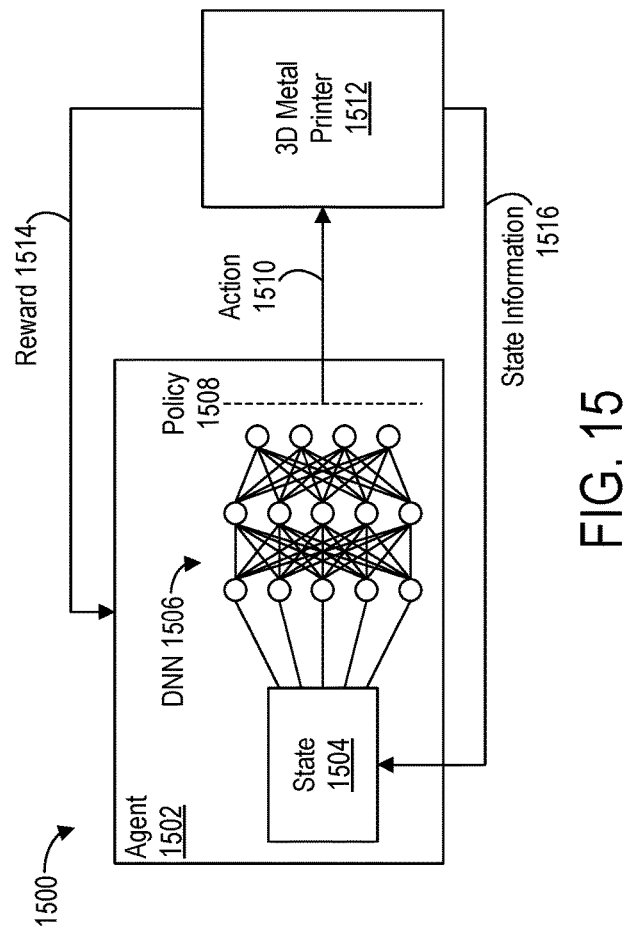
FIG. 15 illustrates a machine-learning feedback process for control of metal additive manufacturing in accordance with some embodiments.

In some embodiments, machine learning is used to control a metal 3D printer (e.g., the metal 3D printer 1300, FIG. 13). FIG. 15 illustrates a machine-learning feedback process 1500 for control of metal additive manufacturing in accordance with some embodiments. A machine-learning agent 1502 (e.g., running on the computer 1302, FIG. 13) receives state information 1516 (e.g., including process feedback data 1406, FIG. 14, from one or more sensors) from a 3D metal printer 1512 during fabrication of a structure 110 (e.g., the metal part in FIG. 14) and uses the state information 1516 to track the state 1504 of the 3D metal printer 1512. The state 1504 is a computer model of the actual state of the 3D metal printer 1512 and is updated based on the state information 1516. In some embodiments, the agent 1502 implements the analytics 1408 (FIG. 14). The machine-learning agent 1502 may also receive reward information 1514 from the 3D metal printer 1512 that reinforces the machine learning.

The state 1504 is coupled to a deep neural network (DNN) 1506 that has been trained to map process inputs to process outputs. Examples of process inputs for the DNN 1506 include, without limitation, material properties (e.g., particle size distribution, melt and boil temperatures, and reflectivity for the powdered metal 104), process parameters (e.g., laser temporal-dependent delivered power, spot size, speed at which a laser-beam cluster is steered, hatch distance, and/or cluster intensity profile (e.g., global intensity profile formed by the superposition of beams in a cluster)), and geometry of the structure 110 (e.g., core, skin, contour, local heat coefficient, overhang angle). Examples of process outputs for the DNN 1506 include, without limitation, melt pool size, melt pool intensity, melt pool temperature, and spatter number (a measure of metal spatter).

A policy 1508 is applied to the results (e.g., the process outputs) of the DNN 1506. If the results satisfy a criterion in the policy 1508, a message is sent to the 3D metal printer 1512 commanding it to perform an action 1510. The action 1510 results in modification of one or more process parameters in the 3D metal printer 1512. The action 1510 may be an example of a change made by the analytics 1408 to the build settings 1404 (FIG. 14).

Figure 16:
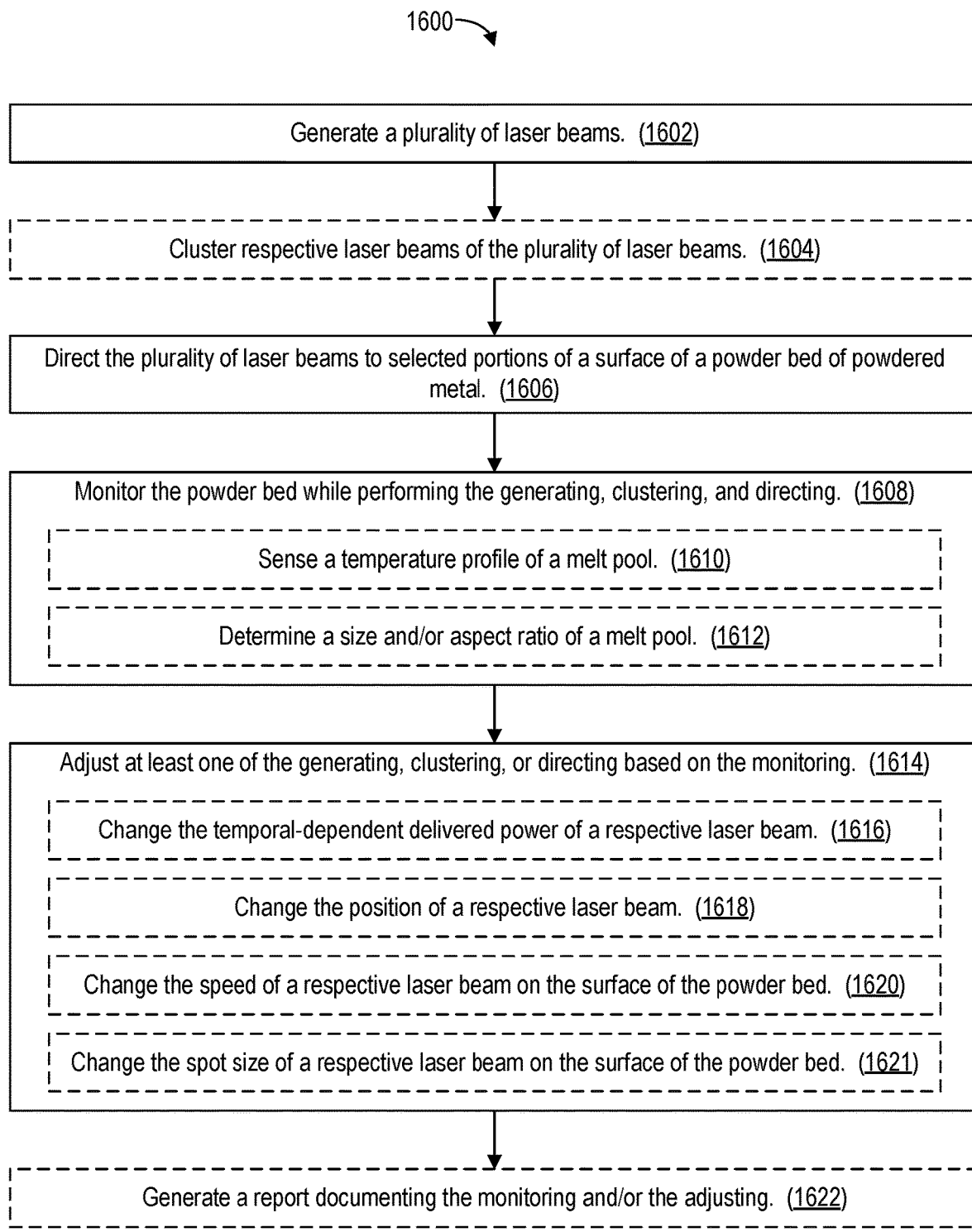
FIG. 16 is a flowchart showing a method of performing metal additive manufacturing with process monitoring and feedback, in accordance with some embodiments.

FIG. 16 is a flowchart showing a method 1600 of performing metal additive manufacturing with process monitoring and feedback, in accordance with some embodiments. In the method 1600, a plurality of laser beams is generated (1602) (e.g., as in step 902, FIG. 9, or 1202, FIG. 12). In some embodiments, respective laser beams of the plurality of laser beams are clustered (1604) (e.g., as in step 910, FIG. 9, or 1212, FIG. 12). The plurality of laser beams (e.g., the clustered laser beams) are directed (1606) to selected portions of a surface of a powder bed (e.g., powder bed 108, FIGS. 6, 11, and/or 13) of powdered metal. This directing may be performed through appropriate steering (e.g., in accordance with step 912, FIG. 9 or 1210, FIG. 12). (In some embodiments, the method 1600 involves one or more laser beams instead of a plurality of laser beams.)

The powder bed is monitored (1608) while performing the generating of step 1602, and directing of step 1606, and in some embodiments the clustering of step 1604. In some embodiments, a temperature profile of a melt pool formed in step 1606 is sensed (1610) (e.g., using pyrometer(s) 1310, FIG. 13). In some embodiments, a size and/or aspect ratio of a melt pool formed in step 1606 is determined (1612) (e.g., using camera 1308, FIG. 13). In some embodiments, these steps are performed by measuring pixel data (e.g., gray-value pixel data) as obtained from the camera 1308 (FIG. 13) and calculating the relevant parameters (e.g., temperature profile, size, and/or aspect ratio).

In some embodiments, pixel data (e.g., gray-value pixel data) for a melt pool is obtained (e.g., from the camera 1308, FIG. 13) and transformed (e.g., using a fast Fourier transform (FFT)) to assess the agitation of the melt pool. In some embodiments, the pixel data is used to determine the gradient for the pixel data (e.g., largest delta in gray-value pixel data) at the edge of the melt pool.

Based on the monitoring, at least one (e.g., any two, or all three) of the generating of step 1602, clustering of step 1604, or directing of step 1606 (e.g., steering) is adjusted (1614). This adjustment may correspond to one or more actions 1510 (FIG. 15). For example, one or more build settings 1404 (FIG. 14) may be changed, which results in the adjustment. In some embodiments, the temporal-dependent delivered power of a respective laser beam of the plurality of laser beams (e.g., of the clustered laser beams) are changed (1616). In some embodiments, the position of a respective laser beam of the plurality of laser beams (e.g., of the clustered laser beams) is changed (1618). In some embodiments, the speed of a respective laser beam of the plurality of laser beams (e.g., of the clustered laser beams) on the surface of the powder bed is changed (1620). In some embodiments, the spot size of a respective laser beam of the plurality of laser beams (e.g., of the clustered laser beams) on the surface of the powder bed is changed (1621) (e.g., via focusing or defocusing). Respective instances of the steps 1616, 1618, 1620, and/or 1621 may be performed for one, some, or all of the plurality of laser beams (e.g., for all or a portion of the clustered laser beams).

In some embodiments, first instances of the generating step 1602 and directing step 1606 (and in some embodiments the clustering step 1604) are performed to fabricate a first structure 110 (e.g., a first copy of a particular metal part). The monitoring step 1608 includes monitoring the powder bed during fabrication of the first structure 110. Second instances of the generating step 1602 and directing step 1606 (and in some embodiments the clustering step 1604) are subsequently performed to fabricate a second structure 110 (e.g., a second copy of the particular metal part, or alternatively a copy of a different metal part). The adjusting step 1614 includes varying at least one of the second instances of the generating step 1602, clustering step 1604, or directing step 1606 with respect to the first instances of the generating step 1602, clustering step 1604, or directing step 1606, based on the monitoring step 1608. For example, the build settings 1404 (FIG. 14) are changed for the second structure 110. This monitoring and adjustment may be performed repeatedly for multiple successively fabricated structures.

In some embodiments, the directing step 1606 includes directing the plurality of laser beams (e.g., the clustered laser beams) to selected portions of a first layer of powdered metal in the powder bed and also to selected portions of a second layer of powdered metal in the powder bed. The second layer is deposited above the first layer in the powder bed (e.g., immediately above the first layer). The monitoring step 1608 includes monitoring the powder bed while directing the plurality of laser beams to the selected portions of the first layer. The adjusting step 1614 includes modifying settings (e.g., the build settings 1404, FIG. 14) for performing the generating step 1602, clustering step 1604, and/or directing step 1606 for the second layer, based on the monitoring performed while directing the plurality of laser beams to the selected portions of the first layer. The adjusting step 1614 further includes performing the generating step 1602 and directing step 1606 (and in some embodiments the clustering step 1604) for the second layer based on the modified settings. This monitoring and adjustment may be performed repeatedly for multiple pairs of layers (e.g., successive pairs of layers).

In some embodiments, the directing step 1606 includes directing the plurality of laser beams (e.g., the clustered laser beams) to selected portions of a first layer of powdered metal in the powder bed. The monitoring step 1608 includes monitoring the powder bed while directing the plurality of laser beams to the selected portions of the first layer. The adjusting step 1614 includes modifying settings (e.g., the build settings 1404, FIG. 14) for performing the generating step 1602, clustering step 1604, and/or directing step 1606 for the first layer, based on the monitoring performed while directing the plurality of laser beams to selected portions of the first layer. The adjusting step 1614 further includes continuing to perform the generating step 1602 and directing step 1606 (and in some embodiments the clustering step 1604) for the first layer based on the modified settings. This monitoring and adjustment may be performed for each of multiple layers (e.g., for every layer).

In some embodiments, the method 1600 further includes training a neural network (e.g., DNN 1506, FIG. 15) to predict process output parameters based on process input parameters for the generating step 1602 and directing step 1606 (and in some embodiments the clustering step 1604). Data collected through the monitoring step 1608 is provided to the neural network, which predicts results for the generating step 1602, clustering step 1604, and/or directing step 1606 based at least in part on the data. The adjusting step 1620 includes varying at least one of the generating step 1602, clustering step 1604, or directing step 1606 based on the predicted results from the neural network (e.g., in accordance with one or more actions 1510, FIG. 15).

In some embodiments, a report (e.g., the quality report 1412, FIG. 14) is generated (1622) that documents the monitoring and/or the adjusting.

The order of the steps in FIG. 16 does not imply a chronological order in which the steps are performed. To the contrary, the steps of the method 1600 may be performed in a simultaneous or overlapping manner. For example, steps 1602, 1604, 1606, and 1608 are performed simultaneously, with step 1614 being performed at certain times.

Figure 17:
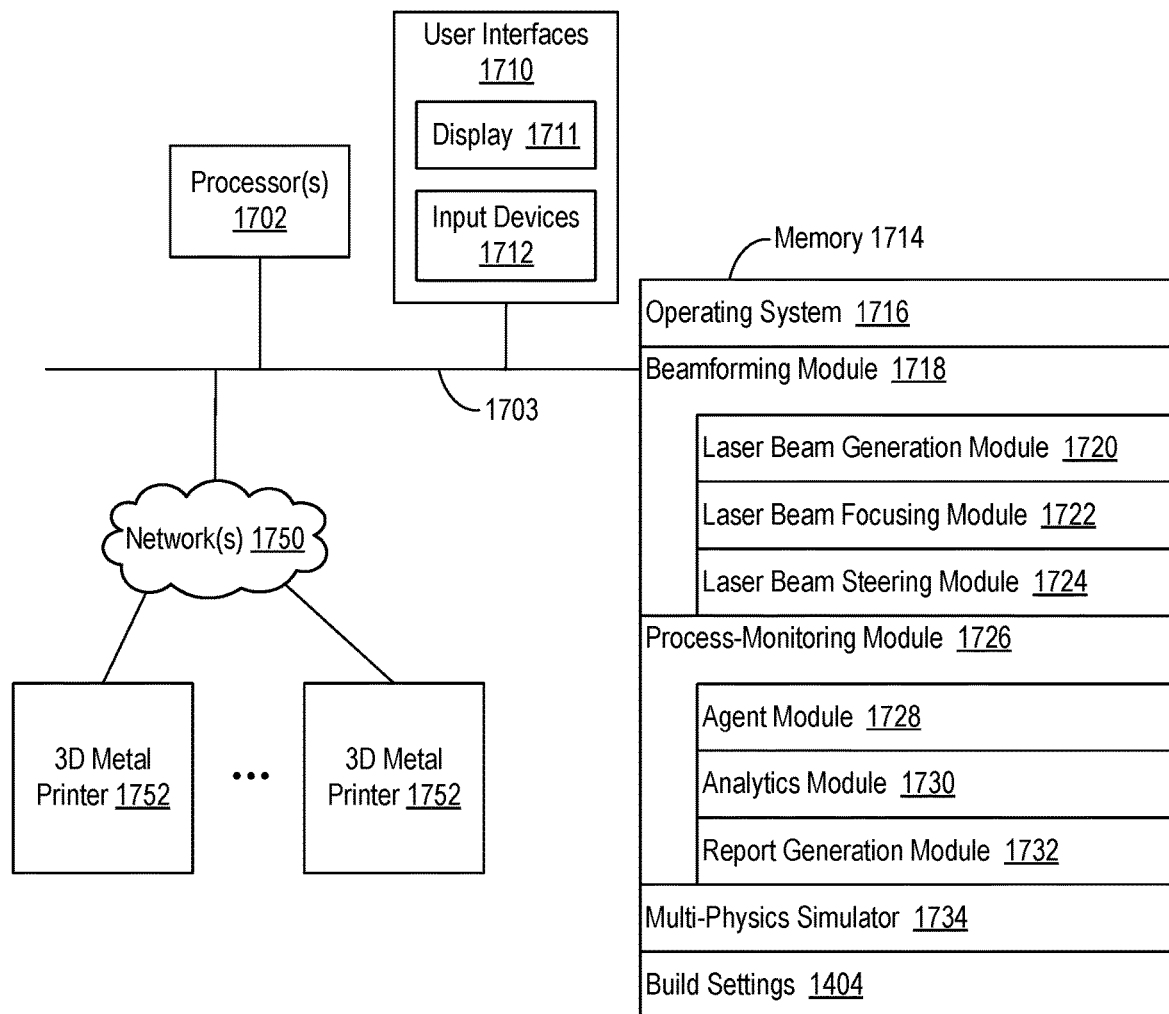
FIG. 17 is a block diagram of a computer-controlled metal additive manufacturing system in accordance with some embodiments.

FIG. 17 is a block diagram of a computer-controlled metal additive manufacturing system 1700 in accordance with some embodiments. The additive manufacturing system 1700 includes one or more 3D metal printers 1752 (e.g., printers 600, FIG. 6; 1100, FIG. 11; 1300, FIG. 13) communicatively coupled through one or more networks 1750 to a computer system (e.g., the computer 1302, FIG. 13). The computer system includes one or more processors 1702 (e.g., CPUs), memory 1714, and one or more communication buses 1703 interconnecting these components. The computer system optionally includes one or more user interfaces 1710 (e.g., a display 1711 and/or input devices 1712).

Memory 1714 includes volatile and/or non-volatile memory. Memory 1714 (e.g., the non-volatile memory within memory 1714) includes a non-transitory computer-readable storage medium. Memory 1714 optionally includes one or more storage devices remotely located from the processors 1702 and/or a non-transitory computer-readable storage medium that is removably inserted into the computer system. In some embodiments, memory 1714 (e.g., the non-transitory computer-readable storage medium of memory 1714) stores the following modules and data, or a subset or superset thereof: an operating system 1716 that includes procedures for handling various basic system services and for performing hardware-dependent tasks, a beamforming module 1718, a process-monitoring module 1726, a multi-physics simulator 1734 (e.g., for performing multi-physics simulations 1402, FIG. 14), and build settings 1404 (FIG. 14). The beamforming module 1718, which allows the 3D metal printers 1752 to implement laser-beam clustering as described herein, may include a laser beam generation module 1720, a laser beam focusing module 1722, and a laser beam steering module 1724. The process-monitoring module may include an agent module 1728 (e.g., for implementing the agent 1502, FIG. 15), an analytics module 1730 (e.g., for performing analytics 1408, FIG. 14), and a report generation module 1732 (e.g., for generating quality reports 1412, FIG. 14).

The memory 1714 (e.g., the non-transitory computer-readable storage medium of the memory 1714) thus includes instructions for performing all or a portion of the methods 900 (FIG. 9), 1200 (FIG. 12), and/or 1600 (FIG. 16). Each of the modules stored in the memory 1714 corresponds to a set of instructions for performing one or more functions described herein. Separate modules need not be implemented as separate software programs. The modules and various subsets of the modules may be combined or otherwise re-arranged. In some embodiments, the memory 1714 stores a subset or superset of the modules and/or data structures identified above.

FIG. 17 is intended more as a functional description of the various features that may be present in a metal additive manufacturing system than as a structural schematic. Items shown separately could be combined and some items could be separated. Furthermore, the functionality provided by the instructions in the memory 1714 may be split between multiple storage media and/or computer systems. For example, a portion of the modules stored in the memory 1714 may alternatively be stored in one or more computer systems communicatively coupled with the metal additive manufacturing system 1700 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of metal additive manufacturing, comprising:
   generating a plurality of laser beams;
   directing the plurality of laser beams to selected portions of a surface of a powder bed of powdered metal;
   clustering respective laser beams of the plurality of laser beams to provide clustered laser beams that at least partially overlap on the surface of the powder bed to form a melt pool on the surface of the powder bed;
   monitoring the powder bed while performing the generating, directing, and clustering, the monitoring comprising imaging the melt pool on the surface of the powder bed using a camera; and
   based on the monitoring, adjusting settings selected from the group consisting of respective powers of some of the clustered laser beams, respective positions on the surface of the powder bed of some of the clustered laser beams, respective speeds on the surface of the powder bed of some of the clustered laser beams, and respective spot sizes on the surface of the powder bed of some of the clustered laser beams; wherein:
   the directing comprises directing the plurality of laser beams to selected portions of a first layer of powdered metal in the powder bed and to selected portions of a second layer of powdered metal in the powder bed, the method further comprising depositing the second layer above the first layer in the powder bed;
   the monitoring comprises monitoring the powder bed while directing the plurality of laser beams to the selected portions of the first layer; and
   the adjusting comprises:
      modifying the settings for the second layer, based on the monitoring performed while directing the plurality of laser beams to the selected portions of the first layer; and
      using the modified settings for the second layer.

2. The method of claim 1, wherein the imaging comprises sensing a temperature profile of the melt pool.

3. The method of claim 1, wherein the imaging comprises determining the size of the melt pool.

4. The method of claim 1, wherein the imaging comprises determining the aspect ratio of the melt pool.

5. The method of claim 1, wherein the imaging comprises:
   obtaining pixel data for the melt pool; and
   transforming the pixel data using a fast Fourier transform (FFT).

6. The method of claim 1, wherein the imaging comprises:
   obtaining pixel data for the melt pool; and
   determining a gradient for the pixel data at the edge of the melt pool.

7. The method of claim 1, wherein the adjusting comprises changing the respective powers of some of the clustered laser beams.

8. The method of claim 1, wherein the adjusting comprises changing the respective positions on the surface of the powder bed of some of the clustered laser beams.

9. The method of claim 1, wherein the adjusting comprises changing the respective speeds on the surface of the powder bed of some of the clustered laser beams.

10. The method of claim 1, wherein the adjusting comprises changing the respective spot sizes on the surface of the powder bed of some of the clustered laser beams.

11. The method of claim 1, further comprising:
    training a neural network to predict process output parameters based on process input parameters for the generating, clustering, and directing; and
    providing data collected through the monitoring to the neural network, wherein the neural network predicts results for the generating, clustering, and directing based at least in part on the data;
    wherein the adjusting comprises varying the at least one setting based on the predicted results from the neural network.

12. The method of claim 1, further comprising generating a report documenting at least one of the monitoring or the adjusting.

13. A metal additive manufacturing system, comprising:
    a three-dimensional (3D) metal printer comprising a plurality of lasers, a powder bed for powdered metal, and a camera;
    one or more processors; and
    memory storing instructions, executable by the one or more processors, for:
       generating a plurality of laser beams;
       directing the plurality of laser beams to selected portions of a surface of a powder bed of powdered metal;
       clustering respective laser beams of the plurality of laser beams to provide clustered laser beams that at least partially overlap on the surface of the powder bed to form a melt pool on the surface of the powder bed;
       monitoring the powder bed while performing the generating, directing, and clustering, the monitoring comprising imaging the melt pool on the surface of the powder bed using the camera; and
       based on the monitoring, adjusting settings selected from the group consisting of respective powers of some of the clustered laser beams, respective positions on the surface of the powder bed of some of the clustered laser beams, respective speeds on the surface of the powder bed of some of the clustered laser beams, and respective spot sizes on the surface of the powder bed of some of the clustered laser beams; wherein:
    the directing comprises directing the plurality of laser beams to selected portions of a first layer of powdered metal in the powder bed and to selected portions of a second layer of powdered metal in the powder bed, the method further comprising depositing the second layer above the first layer in the powder bed;
    the monitoring comprises monitoring the powder bed while directing the plurality of laser beams to the selected portions of the first layer; and
    the adjusting comprises:

modifying the settings for the second layer, based on the monitoring performed while directing the plurality of laser beams to the selected portions of the first layer; and using the modified settings for the second layer.

14. A non-transitory computer-readable storage medium storing one or more programs for execution by one or more processors of a metal additive manufacturing system that further comprises a plurality of lasers, a powder bed for powdered metal, and a camera, the one or more programs including instructions for:

generating a plurality of laser beams;

directing the plurality of laser beams to selected portions of a surface of a powder bed of powdered metal;

clustering respective laser beams of the plurality of laser beams to provide clustered laser beams that at least partially overlap on the surface of the powder bed to form a melt pool on the surface of the powder bed;

monitoring the powder bed while performing the generating, directing, and clustering, the monitoring comprising imaging the melt pool on the surface of the powder bed using a camera; and based on the monitoring, adjusting settings selected from the group consisting of respective powers of some of the clustered laser beams, respective positions on the surface of the powder bed of some of the clustered laser beams, respective speeds on the surface of the powder bed of some of the clustered laser beams, and respective spot sizes on the surface of the powder bed of some of the clustered laser beams; wherein:

the directing comprises directing the plurality of laser beams to selected portions of a first layer of powdered metal in the powder bed and to selected portions of a second layer of powdered metal in the powder bed, the method further comprising depositing the second layer above the first layer in the powder bed;

the monitoring comprises monitoring the powder bed while directing the plurality of laser beams to the selected portions of the first layer; and the adjusting comprises:

modifying the settings for the second layer, based on the monitoring performed while directing the plurality of laser beams to the selected portions of the first layer; and using the modified settings for the second layer.

* * * * *